United States Patent
Choi et al.

(10) Patent No.: US 9,743,222 B2
(45) Date of Patent: Aug. 22, 2017

(54) METHOD FOR CONTROLLING AND AN ELECTRONIC DEVICE THEREOF

(71) Applicant: Samsung Electronics Co., Ltd., Gyeonggi-do (KR)

(72) Inventors: Jong-Ho Choi, Gyeonggi-do (KR); Hyuk Kang, Gyeonggi-do (KR); Kyung-Soo Lim, Gyeonggi-do (KR); Min-Ji Kim, Gyeonggi-do (KR); Jae-Bong Yoo, Gyeonggi-do (KR); Seung-Young Jeon, Gyeonggi-do (KR); Duk-Ki Hong, Seoul (KR); Sang-Don Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 77 days.

(21) Appl. No.: 14/837,182

(22) Filed: Aug. 27, 2015

(65) Prior Publication Data
US 2016/0066127 A1 Mar. 3, 2016

(30) Foreign Application Priority Data
Aug. 27, 2014 (KR) .................. 10-2014-0112254

(51) Int. Cl.
| | |
|---|---|
| *H04B 7/00* | (2006.01) |
| *H04W 4/00* | (2009.01) |
| *H04L 29/08* | (2006.01) |
| *H04W 12/06* | (2009.01) |
| *H04W 76/02* | (2009.01) |
| *B60K 35/00* | (2006.01) |
| *H04L 29/06* | (2006.01) |

(52) U.S. Cl.
CPC ............. *H04W 4/008* (2013.01); *B60K 35/00* (2013.01); *H04L 63/18* (2013.01); *H04L 67/12* (2013.01); *H04W 12/06* (2013.01); *H04W 76/023* (2013.01)

(58) Field of Classification Search
None
See application file for complete search history.

(56) References Cited

U.S. PATENT DOCUMENTS

| | | | |
|---|---|---|---|
| 7,096,030 B2 | 8/2006 | Huomo | |
| 8,053,922 B2 * | 11/2011 | Muller | ................... B60R 25/24 307/10.1 |
| 9,276,736 B2 * | 3/2016 | Peirce | ................... H04L 9/0819 |
| 9,276,737 B2 * | 3/2016 | Peirce | ................... H04L 9/0819 |
| 9,363,647 B2 * | 6/2016 | Kim | ....................... H04W 4/046 |
| 2007/0296559 A1 | 12/2007 | Fehr | |
| 2012/0172010 A1 * | 7/2012 | Oman | .................... G07C 5/008 455/414.1 |
| 2014/0073308 A1 | 3/2014 | Kim | |
| 2015/0365981 A1 * | 12/2015 | Thanayankizil | ...... H04W 4/008 455/41.2 |

FOREIGN PATENT DOCUMENTS

KR 10-2014-0032622 A 3/2014

* cited by examiner

*Primary Examiner* — Tuan A Tran
(74) *Attorney, Agent, or Firm* — Cha & Reiter, LLC

(57) ABSTRACT

A control method and an electronic device thereof are provided. A first electronic device can include a communication unit and a control unit configured to perform providing device identification information to a second electronic device based on a beacon received from the second electronic device through the communication unit, and conducting at least one function corresponding to the signal received from the second electronic device.

20 Claims, 23 Drawing Sheets

METHOD FOR CONTROLLING AND AN ELECTRONIC DEVICE THEREOF

CLAIM OF PRIORITY

The present application claims the benefit under 35 U.S.C. §119(a) to a Korean patent application filed in the Korean Intellectual Property Office on Aug. 27, 2014 and assigned Serial No. 10-2014-0112254, which is hereby incorporated by reference in its entirety for all purposes.

TECHNICAL FIELD

The present disclosure relates generally to an electronic device. More particularly, the present disclosure relates to an apparatus and a method for controlling an electronic device in association with other electronic device.

BACKGROUND

A vehicle may support communication with various electronic devices such as a vehicle diagnostic device, a Personal Digital Assistant (PDA), and a notebook, over a vehicle network. The vehicle can be connected to an Electronic Control Unit (ECU) may configure the vehicle network with the electronic device according to a communication protocol such as Controller Area Network (CAN) (International Organization for Standardization (ISO) 1158), Universal Asynchronous Receiver Transmitter (UART), and Society of Automotive Engineers (SAE) J1850. More specifically, the vehicle includes a vehicle gateway, and can be connected to the electronic device directly using a wired or wireless connection via the vehicle gateway or using Peer to Peer (P2P) connection via Ethernet, a switch, a Wireless Local Area Network (WLAN), and an Access Point (AP).

As various wireless communication methods such as Universal Mobile Telecommunications System (UMTS), Code Division Multiple Access (CDMA), and Wireless Broadband (WiBro) being unit of Mobile Worldwide Interoperability for Microwave Access (WiMAX), WLAN, Wireless Personal Area Network (WPAN), Wireless Fidelity (WIFI), and Bluetooth emerge, an electronic device can communicate with the vehicle network using the various wireless communication methods and provide an integrated service based on vehicle information obtained from the vehicle network.

Accordingly, diverse vehicle applications for providing vehicle related services in association with the vehicle and the electronic device are possible. For example, a driver can use location information, voice navigation, call and message sending, and music play using the vehicle applications while driving a car, by interworking the vehicle and the electronic device.

Mostly, when a driver starts a vehicle, the electronic device can execute a particular function in association with a car kit. However, the car kit is started-up after the driver starts the vehicle and it takes some time to establish communication to a portable terminal. When the vehicle is not running, a driver needs to manually run a vehicle application of the portable terminal.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies of the prior art, it is a primary aspect of the present disclosure to provide an electronic device and its control method for automatically running a vehicle application when a predefined condition is satisfied though a vehicle is not started up.

In one embodiment presented herein, a first electronic device comprises a communication unit; and a control unit configured to perform providing device identification information to a second electronic device based on a beacon received from the second electronic device through the communication unit, and conducting at least one function corresponding to a signal received from the second electronic device.

In another embodiment, an electronic device comprises a communication unit; and a control unit configured to perform providing a beacon comprising application identification information according to a search of another electronic device, and providing the another electronic device with a signal indicating at least one function corresponding to device identification information received from the another electronic device.

In another embodiment, a method for controlling a first electronic device, comprises: receiving a beacon from a second electronic device; providing device identification information to the second electronic device based on the beacon; and conducting at least one function corresponding to a signal received from the second electronic device.

In another embodiment, a non-transitory computer-readable recording medium stores a plurality of executable instructions wherein execution of the executable instructions by a processor causes receiving a beacon from a second electronic device, providing device identification information to the second electronic device based on the beacon, and conducting at least one function corresponding to the signal received from the second electronic device.

Another aspect of the present disclosure is to provide an apparatus and a method for executing a function of an electronic device associated with a vehicle based on at least one of context information and vehicle state information.

Yet another aspect of the present disclosure is to provide an apparatus and a method for controlling a vehicle or an electronic device based on vehicle state information.

According to one aspect of the present disclosure, a first electronic device includes a communication unit; and a control unit for providing device identification information to a second electronic device based on a beacon received from the second electronic device through the communication unit, and conducting at least one function corresponding to the signal received from the second electronic device.

According to another aspect of the present disclosure, a second electronic device includes a communication unit; and a control unit for providing a beacon comprising service identification information according to a search of a first electronic device, and providing the first electronic device with a signal indicating at least one function corresponding to device identification information received from the first electronic device.

According to yet another aspect of the present disclosure, a method for controlling a first electronic device includes receiving a beacon from a second electronic device; providing device identification information to the second electronic device based on the beacon; and conducting at least one function corresponding to a signal received from the second electronic device.

According to still another aspect of the present disclosure, a method for controlling a second electronic device includes providing a beacon comprising service identification information according to a search of a first electronic device, and providing the first electronic device with a signal indicating at least one function corresponding to device identification information received from the first electronic device.

According to a further aspect of the present disclosure, a computer-readable recording medium records a program for receiving a beacon from a second electronic device; providing device identification information to the second electronic device based on the beacon; and conducting at least one function corresponding to a signal received from the second electronic device.

According to a further aspect of the present disclosure, a computer-readable recording medium records a program for providing a beacon comprising service identification information according to a search of a first electronic device, and providing the first electronic device with a signal indicating at least one function corresponding to device identification information received from the first electronic device.

Other aspects, advantages, and salient features of the disclosure will become apparent to those skilled in the art from the following detailed description, which, taken in conjunction with the annexed drawings, discloses embodiments of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components and structures.

DETAILED DESCRIPTION

Figure 1A:
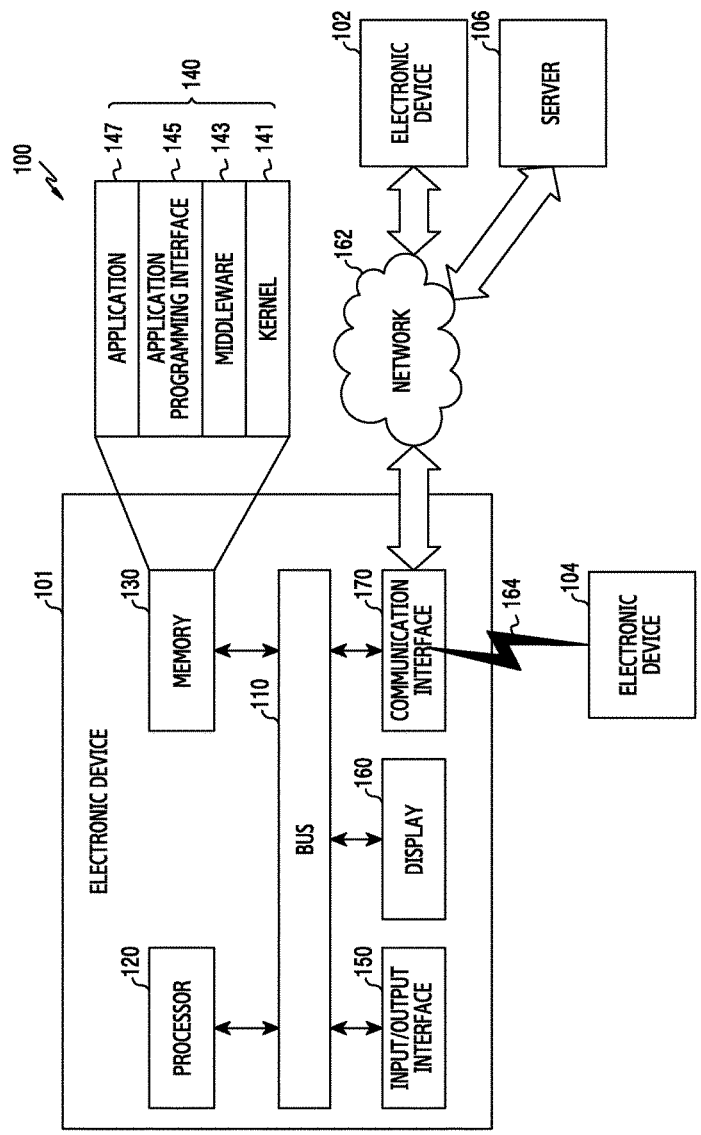
FIG. 1A illustrates an electronic device in a network environment according to an embodiment of the present disclosure.

Hereinafter, the present disclosure is described with reference to the accompanying drawings. The present disclosure may be changed variously and have various embodiments, and specific embodiments are exemplarily described and related detailed descriptions are made in the present specification. However, it should be understood that the various embodiments of the present disclosure are not limited to a specific embodied form and include all modifications and/or equivalents or substitutions that fall within the spirit and technical scope of the present disclosure. In the drawing, like reference numerals are used for like elements.

Expressions such as "include" or "may include", etc. that may be used for the present disclosure indicate existence of a disclosed relevant function, operation, or element, etc., and do not limit additional one or more functions, operations, or elements, etc. Also, it should be understood that terminologies such as "include" or "have", etc. in the present disclosure are intended for designating existence of a characteristic, a number, a step, an operation, an element, a part, or a combination of these described on the specification and do not exclude in advance existence or addition possibility of one or more other characteristics, numbers, steps, operations, elements, parts, or a combination of these.

Expression such as "or", etc. in the present disclosure includes a certain and all combinations of words listed together. For example, "A or B" may include A and may include B, or include both A and B.

In the present disclosure, expressions such as "1st", "2nd", "first" or "second", etc. may modify various elements of the present disclosure but do not limit relevant elements. For example, the expressions do not limit sequence and/or importance, etc. of relevant elements. The expressions may be used for discriminating one element from another element. For example, both a first user apparatus and a second user apparatus are all user apparatuses, and represent different user apparatuses. For example, a first element may be named as a second element without departing from the scope of the present disclosure, and similarly, the second element may be named as the first element.

When it is mentioned that a certain element is "connected to" or "accesses" another element, it should be understood that the element may be directly connected to another element or may directly access another element, but still another element may exist in the middle. In contrast, when it is mentioned that a certain element is "directly connected to" or "directly accesses" another element, it should be understood that still another element does not exist in the middle. Additionally, in the context of communications, "connected to" shall be understood to include a wireless connection. For example, the "communication connection" shall be understood to include elements that are configured or operable to communicate electronically with each other, including via radio communications.

A terminology used in the present disclosure is used for explaining only a specific embodiment and is not intended for limiting the present disclosure. Unless clearly expressed otherwise, expression of the singular includes expression of the plural.

Unless defined differently, all terminologies used herein including technological or scientific terminologies have the same meaning as that generally understood by a person of ordinary skill in the art to which the present disclosure belongs. It should be understood that generally used terminologies defined by a dictionary have meaning coinciding with meaning on context of a related technology, and unless clearly defined in the present disclosure, they are not understood as an ideal or excessively formal meaning.

An electronic device according to the present disclosure may be a device including a communication function. For example, an electronic device may include at least one of a smartphone, a tablet personal computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, or a wearable device (e.g., a head-mounted-device (HMD) such as electronic glasses, an electronic clothing, an electronic bracelet, an electronic necklace, an electronic accessory, an electronic tattoo, or a smartwatch).

According to certain embodiments, an electronic device may be a smart home appliance having a communication function. A smart home appliance may include, for example, at least one of a television, a Digital Video Disk (DVD) player, an audio, a refrigerator, an air conditioner, a cleaner, an oven, an electronic range, a washing machine, an air purifier, a set-top box, a TV box (e.g., Samsung HomeSync™, Apple TV™, or Google TV™), game consoles, an electronic dictionary, an electronic key, a camcorder, or an electronic frame.

According to certain embodiments, an electronic device may include at least one of various medical devices (e.g., Magnetic Resonance Angiography (MRA), Magnetic Resonance Imaging (MRI), Computed Tomography (CT), a shooting device, an ultrasonic device, etc.), a navigation device, a Global Positioning System (GPS) receiver, an event data recorder (EDR), a flight data recorder (FDR), an automobile infotainment device, electronic equipment for a ship (e.g., a navigation device for a ship, a gyro compass, etc.), an avionics, a security device, or a robot for an industrial use or a home use.

According to certain embodiments, an electronic device may include at least one of a furniture or a portion of a building/structure including a communication function, an electronic board, an electronic signature receiving device, a projector, or various measurement devices (e.g., waterworks, electricity, gas, or radio wave measuring device, etc.). An electronic device according to the present disclosure may be a combination of one or more of the above-described devices. Also, it is obvious to a person of ordinary skill in the art that the electronic device according to the present disclosure is not limited to the above-described devices.

Hereinafter, an electronic device according to various embodiments of the present disclosure is described with reference to the accompanying drawings. A terminology of a user used in various embodiments may indicate a person who uses an electronic device or a device (e.g., an artificial intelligence electronic device) that uses the electronic device.

FIG. 1A is a view illustrating a network environment 100 including an electronic device 101 according to various embodiments. Referring to FIG. 1, the electronic device 101 may include a bus 110, a processor 120, a memory 130, an input/output (I/O) interface 150, a display 160, and a communication interface 170. In certain embodiments, the electronic device 101 may be configured to receive and execute remote commands relating to a vehicle application. Alternatively, the electronic device 101 may be configured to transmit commands to another electronic device, causing the another electronic device to execute the remote commands relating to a vehicle application.

The bus 110 may be a circuit for connecting the above-described elements with each other, and transferring communication (e.g., a control message) between the above-described elements.

The processor 120 may include a central processing unit (CPU), a communication processor (CP), a graphic processing unit (GPU).

The processor 120 may receive, for example, an instruction from the above-described other elements (e.g., the memory 130, the I/O interface 150, the display 160, or the communication interface 170, etc.) via the bus 110, decipher the received instruction, and execute an operation or a data process corresponding to the deciphered instruction. In certain embodiments, the processor 120 may execute a vehicle application responsive to a remote command from another electronic device.

The memory 130 may store an instruction or data received from the processor 120 or other elements (e.g., the I/O interface 150, the display 160, or the communication interface 170, etc.), or generated by the processor 120 or other elements. The memory 130 may include, for example, programming modules 140 such as a kernel 141, a middleware 143, an application programming interface (API) 145, or an application 147. The each of the programming modules may be configured using a software, a firmware, a hardware, or a combination of two or more of these.

The kernel 141 may control or manage system resources (e.g., the bus 110, the processor 120, or the memory 130, etc.) used for executing an operation or a function implemented in the rest of the programming modules, for example, the middleware 143, the API 145, or the application 147. Also, the kernel 141 may provide an interface for allowing the middleware 143, the API 145, or the application 147 to access an individual element of the electronic device 101 and control or manage the same.

The middleware 143 may perform a mediation role so that the API 145 or the application 147 may communicate with the kernel 141 to give and take data. Also, in connection with task requests received from the applications 147, the middleware 143 may perform a control (e.g., scheduling or load balancing) for a task request using, for example, a method of assigning priority that may use a system resource (e.g., the bus 110, the processor 120, or the memory 130, etc.) of the electronic device 101 to at least one application 134.

The API 145 is an interface for allowing the application 147 to control a function provided by the kernel 141 or the middleware 143, and may include at least one interface or function (e.g., an instruction) for file control, window control, image processing, or character control, etc.

According to various embodiments, the application 147 may include a Short Message Service/Multimedia Messaging Service SMS/MMS application, an e-mail application, a calendar application, alarm application, a health care application (e.g., an application for measuring quantity of motion or blood sugar, etc.), or an environment information application (e.g., an application providing atmospheric pressure, humidity or temperature information, etc.). Additionally or alternatively, the application 147 may be an application related to information exchange between the electronic device 101 and an external electronic device (e.g., the electronic device 102 or 104). The application related to the information exchange may include, for example, a notification relay application for transferring specific information to the external electronic device or a device management application for managing the external electronic device.

For example, the notification relay application may include a function for transferring notification information generated from a different application (e.g., an SMS/MMS application, an e-mail application, a health care application, or an environment information application) of the electronic device 101 to an external electronic device (e.g., the electronic device 102 or 104). Additionally or alternatively, the notification relay application may, for example, receive notification information from an external electronic device (e.g., the electronic device 102 or 104) and provide the same to a user. The device management application may manage (e.g., install, delete, or update) a function (e.g., turn-on/turn-off of an external electronic device itself (or some constituent part) or luminance (or resolution) control of a display) of an external electronic device (e.g., the electronic device 102 or 104) communicating with the electronic device 101 and an application operating in the external electronic device or a service (e.g., a communication service or a message service) provided by the external electronic device.

In certain embodiments, the memory 140 may store information such as a setting value for a vehicle application, an auto launch condition and an auto exit condition for a vehicle application, and vehicle information.

According to various embodiments, the application 147 may include a designated application depending on an attribute (e.g., a kind of an electronic device) of the external electronic device (e.g., the electronic device 104). For example, in the case where the external electronic device is an MP3 player, the application 147 may include an application related to music reproduction. Similarly, in the case where the external electronic device is a mobile medical health care device, the application 147 may include an application related to health care. According to an embodiment, the application 147 may include at least one of an application designated in the electronic device 101 and an application received from the external electronic device (e.g., the server 106, the electronic device 102 or 104).

The I/O interface 150 may transfer an instruction or data input from a user via an I/O unit (e.g., a sensor, a keyboard, or a touchscreen) to the processor 120, the memory 130, or the communication interface 170 via the bus 110, for example. For example, the I/O interface 150 may provide data regarding a user's touch input via the touchscreen to the processor 120. Also, the I/O interface 150 may, for example, output an instruction or data received via the bus 110 from the processor 120, the memory 130, or the communication interface 170 via the I/O unit (e.g., a speaker or a display). For example, the I/O interface 150 may output voice data processed by the processor 120 to a user via a speaker.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display. The display 160 may display various types of contents (for example, text, images, videos, icons, or symbols) for users. The display 160 may include a touch screen, and may receive, for example, a touch, gesture, proximity, or hovering input by using an electronic pen or a part of the user's body.

In certain embodiments, the display 160 can display information related to a vehicle application. For example, the display 160 can be used to display status indicators indicating whether the electronic device 101 is in the vicinity of another electronic device, an interface for vehicle related services (see FIGS. 9 and 10), vehicle state information (see FIGS. 11 and 12), steering information (see FIG. 15), driver fatigue information and assistance (see FIGS. 16 and 17), and vehicle boarding information (see FIGS. 18 and 20).

The communication interface 170 may connect communication between the electronic device 100 and an external device (for example, the electronic device 104 or the server 106). For example, the communication interface 170 may be connected to a network 162 through wireless communication or wired communication, and may communicate with an external device.

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM) as a cellular communication protocol.

The wireless communication may include at least one of, for example, WiFi, Bluetooth, BLE, Zigbee, Infrared (IR) communication, and ultrasonic communication as a short-range communication protocol 164.

The wired communication may include, for example, at least one of universal serial bus (USB), high definition multimedia interface (HDMI), recommended standard 232 (RS-232), and plain old telephone service (POTS).

The network 162 may include at least one of communication networks such as a computer network (for example, a LAN or a WAN), the Internet, and a telephone network.

In certain implementations, the electronic device 101 can use the communication interface for scanning for another electronic device, transmitting a setting value for a vehicle application and vehicle information and receiving a broadcast beacon with vehicle application information, and remote commands, via a communication link with the another electronic device. Alternatively, the electronic device 101 can use the communication interface for receiving a setting value for a vehicle application and vehicle information and transmitting a broadcast beacon with vehicle application information, and remote commands, via a communication link with the another electronic device.

The electronic devices 102 and 104 may be devices of the same type as that the electronic device 101 or devices of different types from that of the electronic device 101. According to an embodiment, the server 106 may include a group of one or more servers. According to various embodiments, all or some of the operations executed in the electronic device 101 may be carried out in another electronic device or a plurality of electronic devices (for example, the electronic device 102 or 104 and the server 106). According to an embodiment, when the electronic device 101 should perform some functions or services automatically or by a request, the electronic device 101 may make a request for performing at least some functions related to the functions or services to another device (for example, the electronic device 102 or 104, or the server 106) instead of performing the functions or services by itself or additionally. The electronic device (for example, the electronic device 102 or 104, or the server 106) may carry out the functions requested by the electronic device 101 or additional functions and provide results thereof to the electronic device 101. The electronic device 101 may provide the requested functions or services to another electronic device based on the received results or after additionally processing the received results. To this end, for example, cloud computing, distributed computing, or client-server computing technology may be used.

Figure 1B:
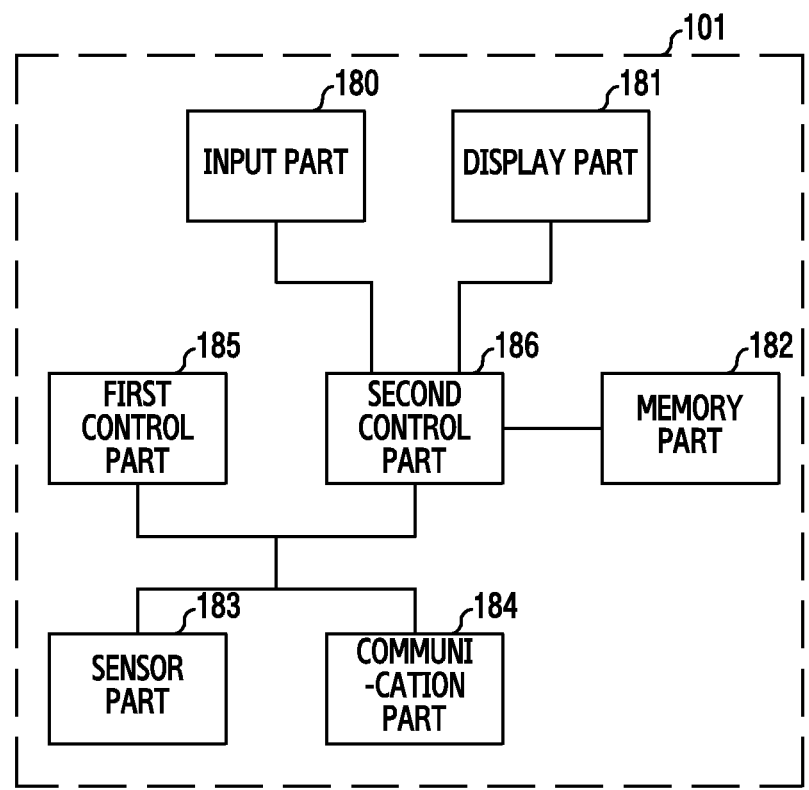
FIG. 1B illustrates a first electronic device according to an embodiment of the present disclosure.

FIG. 1B depicts a first electronic device according to an embodiment of the present disclosure. The first electronic device can comprise the electronic device 101 of FIG. 1A. The first electronic device 101 can include an input part 180, a display part 181, a memory part 182, a sensor part 183, a communication part 184, a first control part 185, and a second control part 186.

The input part 180 can be a device for receiving a signal from the user. The input part 180 can include a keypad including a plurality of key buttons, or a touch screen including a soft key on a screen. Besides, the input part 180 can employ any means for inputting a signal to the first electronic device 101 according to a user manipulation using a joystick or a wheel. The input part 180 can be implemented using a function key or a soft key selected to control a vehicle application, for example, an application for supporting navigation, music play, or calling.

The display part 181 displays an execution screen according to an operation of the first electronic device 101. The display part 181 can be implemented using a Liquid Crystal Display (LCD), an Organic Light Emitting Diode (OLED), an Active Matrix OLED (AMOLED), and a touch screen supporting a touch input.

Figure 10:
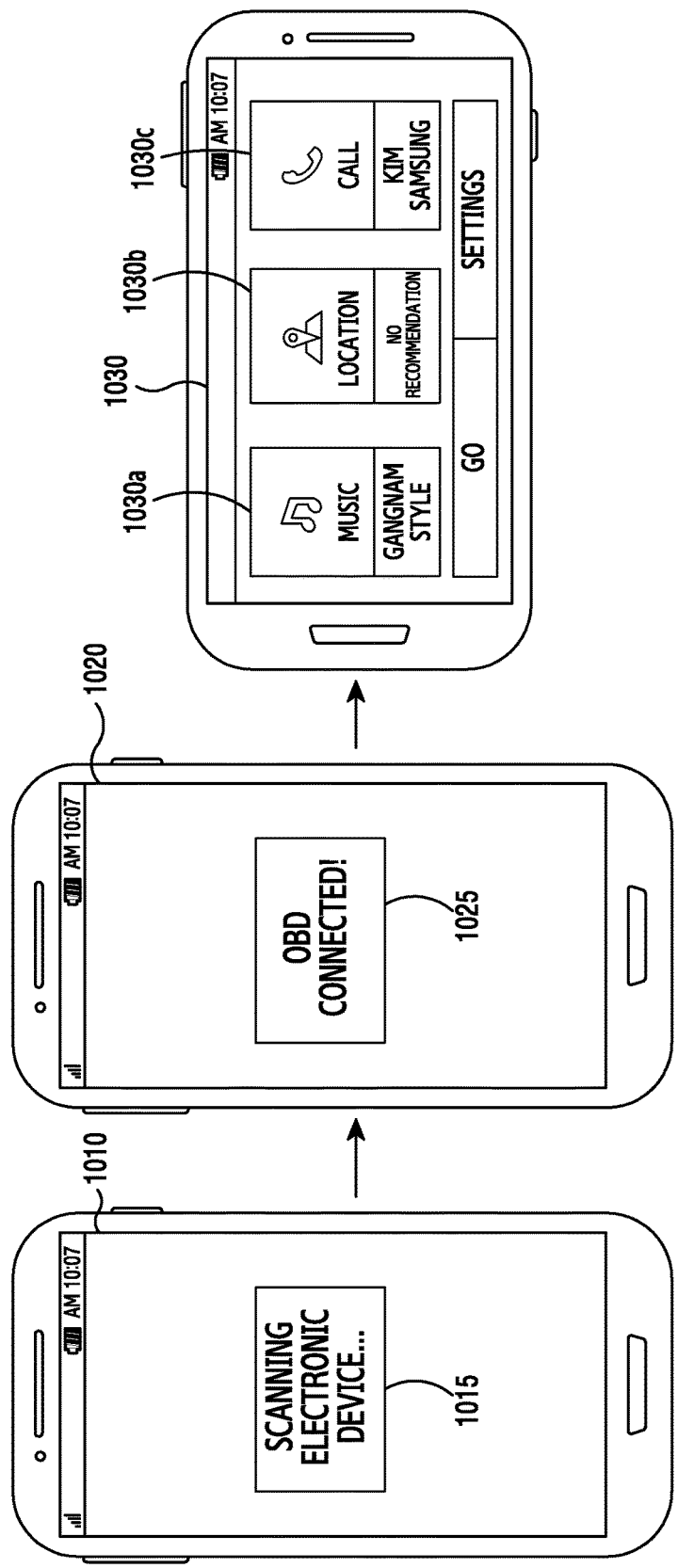
FIG. 10 illustrates a vehicle application execution screen of a first electronic device according to an embodiment of the present disclosure.
Figure 13:
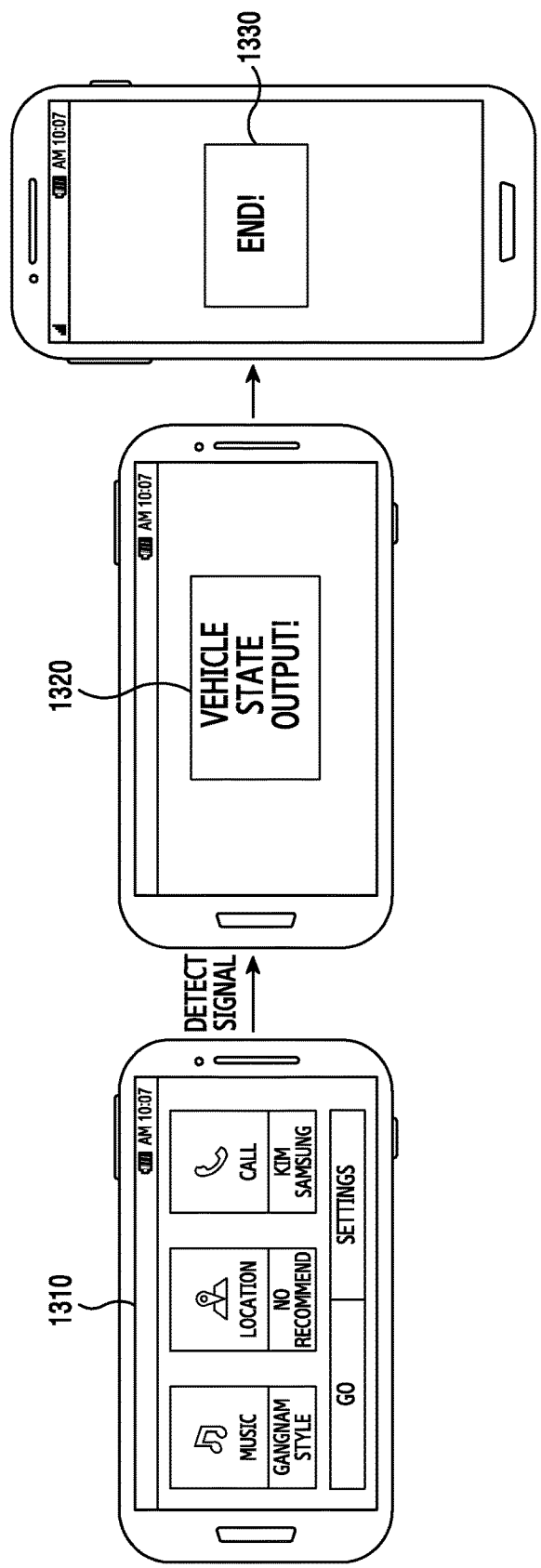
FIG. 13 illustrates a vehicle application exit screen of a first electronic device according to an embodiment of the present disclosure.

The display part 181 can display a screen for setting the vehicle application. For example, the display part 181 can display an available screen in the vehicle application execution, for example, a menu selection screen, a navigation guide screen, a music play screen, and a call connection screen. FIGS. 10 and 13 describe embodiments where the display part 181 may be used in the vehicle application for a menu selection screen, a navigation guide screen, a music play screen, and a call screen.

The display part 181 can display information about a second electronic device scanned near the first electronic device 101, for example, an On Board Diagnostics (OBD) or a car kit (the electronic device 102 and 104 of FIG. 1A), and display a setting screen, a guide screen, and a control screen for connecting the communication to the second electronic device. FIGS. 10 and 13 describe embodiments where the display part 181 may be used in the vehicle application for a menu selection screen, a navigation guide screen, a music play screen, and a call screen.

Figure 12:
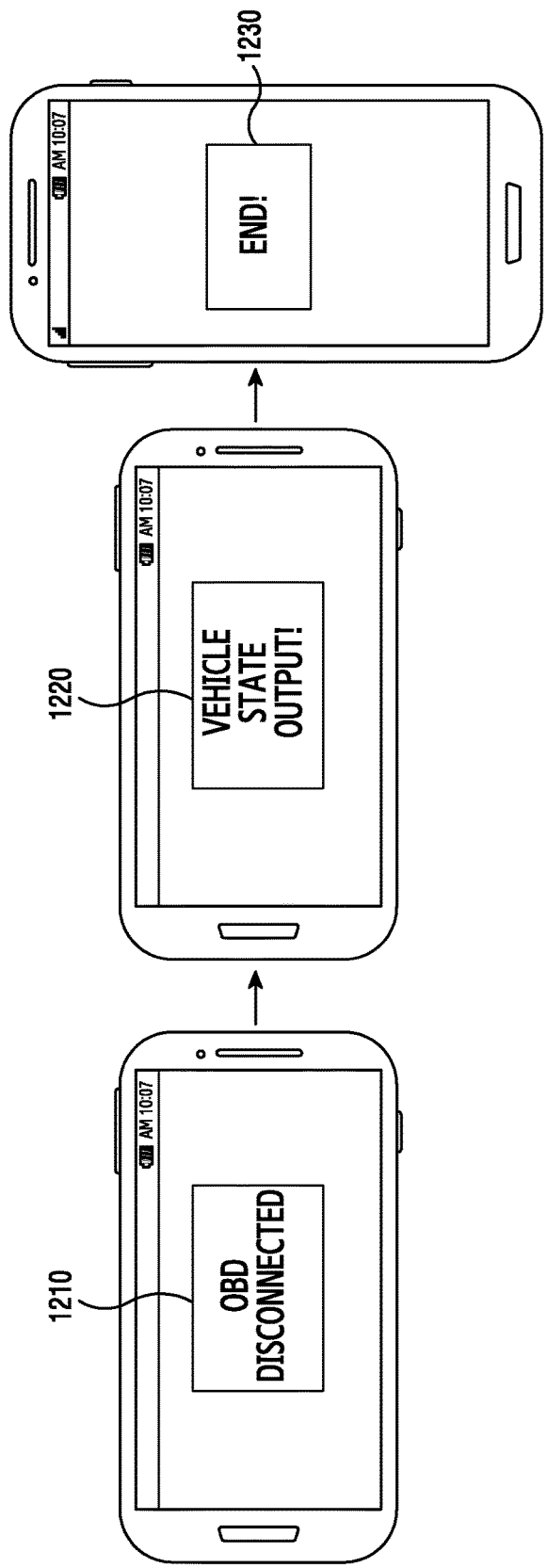
FIG. 12 illustrates a vehicle application exit screen of a first electronic device according to an embodiment of the present disclosure.
Figure 16:
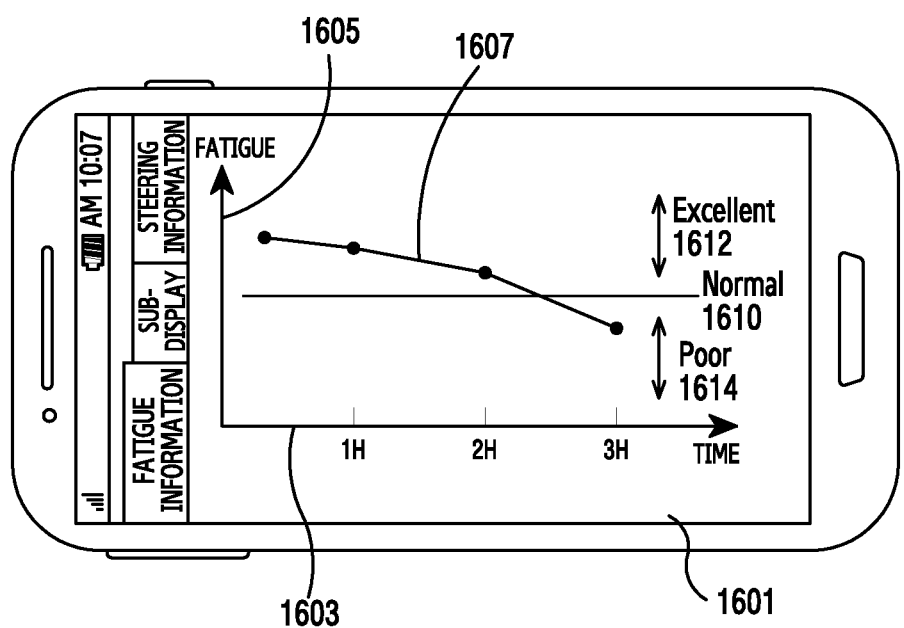
FIG. 16 illustrates a vehicle application execution screen of a first electronic device according to an embodiment of the present disclosure.

The display part 181 can output a vehicle application execution screen of the first electronic device 101 linked to the second electronic device. The display part 181 can output vehicle state information and user body information (e.g., calorie consumption information, fatigue information). FIGS. 12 and 13 describe embodiments where the display part 181 may output vehicle state information. FIG. 16 describes embodiments where the display part 181 may output fatigue information.

Figure 11:
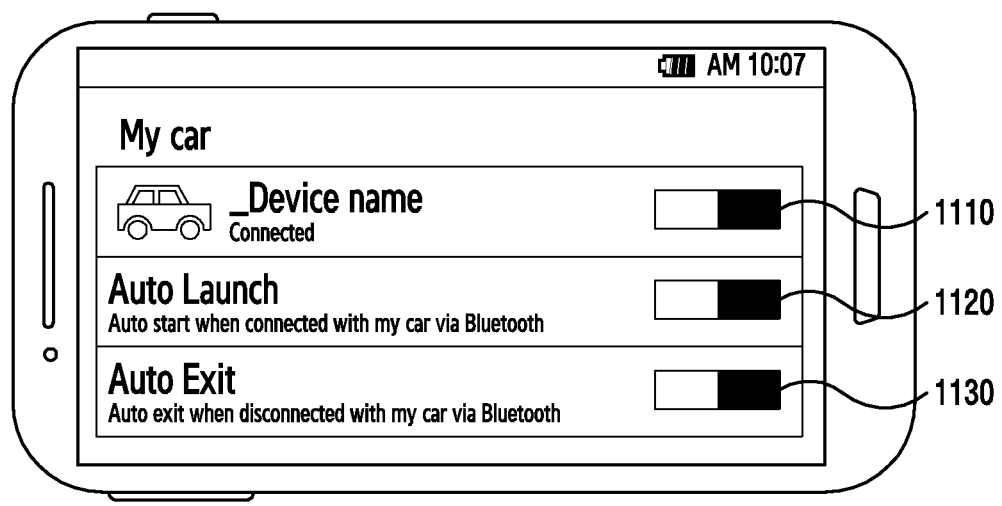
FIG. 11 illustrates a vehicle application setting screen of a first electronic device according to an embodiment of the present disclosure.

The memory part 182 can store a setting value for the operation of the first electronic device 101, and a program and an application for the operation of the first electronic device 101. The memory part 182 can store a setting value for the vehicle application. For example, the memory part 182 can store an auto launch condition and an auto exit condition of the vehicle application, vehicle information (e.g., My-Car ID), and first electronic device information. FIG. 11 describes an embodiment where the setting the value, the auto launch condition, and the auto exit condition may be based on the memory part 182.

The auto launch condition and the auto exit condition of the vehicle application can be determined with, but not limited to, a sensor value detected by a sensor of the sensor part 183, for example, magnetic field information of a magnetic sensor or a boarding/disembarking pattern detected by an acceleration sensor. For example, the auto launch condition and the auto exit condition of the vehicle application may be determined with, but not limited to, a communication connection state of the second electronic device scanned in vicinity of the first electronic device 101. The communication connection state can be related to scanning for the second electronic device and communication disconnection from the linked second electronic device.

The memory part 182 can store information generated in the communication between the first electronic device 101 and the second electronic device, for example, a Media Access Control (MAC) address, a device identifier, a vehicle identifier (e.g., MyCar ID), a vehicle application identifier (e.g., a service Unique User Identifier (UUID)), and an application setting value. The memory part 182 may store information for establishing communication with a wearable device, or second electronic device and information generated in communication with the wearable device or second electronic device. Embodiments where establishment of communication with a second device may be based on the foregoing will be described in further detail in FIGS. 4A and 6.

The sensor part 183 can detect a movement of a body of the first electronic device 101. Herein, the sensor part 183 can include at least two of a magnetic sensor for detecting a magnetic field around the first electronic device 101, an acceleration sensor for outputting an electric signal according to three-axis acceleration produced from the movement of the body of the first electronic device 101, an inertial sensor for outputting an electric signal according to a three-axis location change from the movement of the body of the first electronic device 101, and a microphone for detecting noise around the first electronic device 101.

For example, the magnetic sensor can detect a magnetic field value or a magnetic field change of a permanent magnet such as a speaker disposed at a vehicle door when the first electronic device 101 comes into the vehicle, and detect a magnetic field change when the first electronic device 101 gets out of the vehicle. The acceleration sensor can detect a walking status and a halt status of the user of the first electronic device 101, and a particular pattern of the user motion, for example, a boarding pattern and an disembarking pattern. The inertial sensor can detect vibration in the vehicle when the vehicle is started up. The microphone can detect noise when the vehicle door is closed or the vehicle is started up or the ignition is turned off.

The sensor part 183 can detect information for obtaining a boarding location of the user when the user boards the vehicle. For example, the magnetic sensor can detect a magnetic field direction, and the acceleration sensor can detect a user boarding direction (e.g., the boarding direction from left to right or from right to left). The inertial sensor can detect a tilt in the vehicle boarding, and the microphone can detect a noise direction when the vehicle door is closed.

When the vehicle is running, the sensor part 183 can detect information for obtaining vehicle driving information. For example, the vehicle driving information can pertain to a rotation state of the running vehicle (e.g., a left turn or a right turn), a braking state, a window state (e.g., window opened or closed), a door state (e.g., door opened or close), a driving path, a driving time, and a driving direction.

For example, the acceleration sensor can detect a vehicle rotation level (e.g., a quick turn). The microphone can detect the vehicle window opening or closing. The inertial sensor can detect a braking level (e.g., a sudden brake).

The sensor part 183 can employ any sensor for detecting the movement of the body of the first electronic device 101, a context change around the first electronic device 101, the vehicle boarding and/or disembarking, the user boarding location, and the vehicle driving information.

The sensor part 183 can provide the first control part 185 with the information detected by the sensors so as to determine the vehicle boarding and/or disembarking, the user vehicle boarding location, and the vehicle driving information. The sensor part 183 may provide the information detected by the sensors directly to the second control part 186. Embodiments describing operation of a vehicle application that may be based on the sensor part 183 will be described in greater detail in connection with FIGS. 15-18, and 20.

The communication part 184 can support a wireless communication interface of the first electronic device 101. The communication part 184 can include a WLAN module for supporting a short-range communication with the second electronic device, for example, a wearable device, a car accessory such as OBD, and the car kit. The WLAN module can support various short-range communications, for example, Bluetooth Low Energy (BLE) and Bluetooth.

The WLAN module can page the paired wearable device using Bluetooth, and send and receive data to and from the linked wearable device. The WLAN module can receive operation information from the linked wearable device, and forward the received operation information to the first control part 185 or the second control part 186. The WLAN module can try to page a second electronic device using BLE and/or Bluetooth, be linked to the second electronic device, and receive a control command of the vehicle application. In so doing, the communication part 184 can forward the control command received from the second electronic device, to the second control part 186.

The communication part 184 can include a first communication part and a second communication part according to the short-range communication method. Herein, the first communication part can support one of BLE and Bluetooth, and the second communication part can support the other. For example, the first communication part can use BLE when the first electronic device 101 enters a sleep mode, and the second communication part can use Bluetooth when the first electronic device 101 enters a normal mode. For example, using BLE, the first communication part can send at least one of, but not limited to, the device identifier, the vehicle identifier (e.g., MyCar ID), and the vehicle application identifier (e.g., service UUID) to the second electronic device based on a received beacon broadcast by the second electronic device. Further, using Bluetooth, the second communication part can receive, but not limited to, information relating to the control command, the vehicle information, and the body information from the second electronic device.

The communication part 184 may further include at least one of a communication module for building a communication channel with a communication network and a Global Positioning System (GPS) module for building a communication channel with a satellite network. Herein, the GPS module can collect GPS information (e.g., location coordinates, altitude) when the user disembarking is detected, and provide the collected GPS information to the second control part 186.

The first control part 185 can recognize whether a predefined condition for executing the vehicle application and/or a particular vehicle function is satisfied or whether a predefined condition for exiting the vehicle application and/or the particular vehicle function is satisfied. Embodiments where the determination of the predefined condition may be based on the first control part 185 in will be described in greater detail in connection with FIGS. 9-11. Hence, when the first electronic device 101 is in the sleep mode and the predefined condition for executing the application and/or the particular vehicle function is satisfied, the first control part 185 can issue a signal for driving the second control part 186. For example, when the first electronic device 101 is in the normal mode and the predefined condition for executing the application and/or the particular vehicle function is satisfied, the first control part 185 can issue a signal for requesting the vehicle information through the second control part 186. For example, when the predefined condition for exiting the application and/or the particular vehicle function is satisfied, the first control part 185 can issue a signal for exiting the running vehicle application and/or the function. Embodiments where the determination of the predefined condition for exiting the application may be based on the first control part 185 in will be described in greater detail in connection with FIGS. 12-13. The first control part 185 can include a sensor hub. For example, the first control part 185 can monitor the sensor part 183 and/or the communication part 184 and determine whether the predefined condition is satisfied.

The first control part 185 can detect the operation of the sensor 183, obtain at least one of the boarding pattern, the disembarking pattern, and the vehicle boarding location, and thus determine whether the predefined condition is satisfied.

For example, the first control part 185 can determine whether a predefined boarding pattern (e.g., walking→halt) or disembarking pattern (e.g., halt→walking) is detected through the acceleration sensor of the sensor part 183. For example, the first control part 185 can determine whether a predefined magnetic field (e.g., a magnetic field value or magnetic field change) is detected through the magnetic sensor of the sensor part 183. In this case, the first control part 185 can determine the predefined magnetic field is detected by comparing the magnetic field detected by the magnetic sensor with at least one of magnetic field information registered for the user's vehicle and magnetic field information provided from a vehicle manufacturer. When the acceleration sensor detects the predefined boarding pattern and the magnetic sensor detects the predefined magnetic field, the first control part 185 can determine that the user boards the vehicle. An embodiment where detection of a predetermined board pattern may be based on the sensor part 183 or the first control part 185 will be described in greater detail with respect to FIG. 18.

For example, the first control part 185 can determine whether the magnetic field detected by the magnetic sensor changes from the preset magnetic field. When the acceleration sensor detects the predefined disembarking pattern and the magnetic field detected by the magnetic sensor changes from the preset magnetic field, the first control part 185 can determine that the user disembarks from the vehicle.

For example, the first control part 185 can determine whether a vibration of a preset pattern is detected by the inertial sensor of the sensor part 183. The first control part 185 may determine whether noise of a preset volume or tone is detected by the microphone of the sensor part 183. When the information detected by the acceleration sensor and the magnetic sensor satisfy the preset condition and the preset vibration and/or noise is detected, the first control part 185 may determine the user boarding or disembarking. Notably, the first control part 185 may determine the user boarding or disembarking when the information detected by at least two of the acceleration sensor, the magnetic sensor, the inertial sensor, and the microphone satisfy the preset condition.

For example, when the user boards the vehicle, the first control part 185 may determine the user boarding location based on the information detected by at least one of the acceleration sensor, the magnetic sensor, the inertial sensor, and the microphone. For example, the first control part 185 can determine which one of a driver seat and a passenger seat the user sits in based on at least one of the magnetic field change detected by the magnetic sensor, the user boarding direction detected by the acceleration sensor, the tilt direction detected by the inertial sensor, and the noise direction detected by the microphone.

For example, the first control part 185 can receive operation information from the second electronic device (a peripheral), for example, from a wrist wearable device through the communication part 184. When the user boards the vehicle, the first control part 185 can determine the user boarding location (e.g., the driver seat or the passenger seat) using the operation information received from the second electronic device, for example, motion and/or direction information of a hand closing the vehicle door.

For example, the first control part 185 can confirm beacon reception of the second electronic device by detecting the operation of the communication part 184, and determine whether a preset condition is satisfied based on the beacon. For example, when receiving a beacon including a vehicle application identifier (e.g., service UUID) corresponding to pre-stored information, the first control part 185 can confirm that the preset condition for executing the vehicle application and/or the particular vehicle function is satisfied.

When the preset condition for executing the vehicle application and/or the particular vehicle function is satisfied, the first control part 185 can confirm a link key of a signal received from the second electronic device and control the communication connection between the communication part 184 and the second electronic device. For example, the first control part 185 can extract a vehicle identifier and a vehicle application setting value based on the vehicle application identifier (e.g., the service UUID) of the beacon received from the second electronic device, and send the extracted vehicle identifier and vehicle application setting value to the second electronic device. The second electronic device can control the vehicle application of the first electronic device 101 based on the vehicle identifier and the vehicle application setting value.

When the communication through the communication part 184 is disconnected from the linked second electronic device, for example, from the OBD or the car kit during the vehicle application execution in the first electronic device 101, the first control part 185 can issue a signal for exiting the vehicle application execution.

The first control part 185 can provide the second control part 186 with distance information based on Received Signal Strength Indicator (RSSI) change of signals transmitted to and received from the second electronic device (e.g., a wearable device, the OBD, the car kit) linked via the communication part 184. The second control part 186 can request to check the vehicle state based on the distance information fed from the first control part 185, or conduct a leave-behind notification function for the first electronic device 101.

When the first electronic device 101 is in the sleep mode, the second control part 186 can operate based on a signal received from the first control part 185. For example, the second control part 186 can operate based on the signal issued from the first control part 185 when the vehicle boarding is detected. For example, the second control part 186 can operate based on the signal issued from the first control part 185 when the beacon is received from the second electronic device (e.g., the OBD, the car kit).

The second control part 186 can automatically run the vehicle application based on the signal issued by the first control part 185. The second control part 186 can various functions such as a navigation support function, a black box support function, a music play function, a call function, and a search function. For example, the signal issued by the first control part 185 can be related to the control command received from the second electronic device.

When the vehicle application is running, the second control part 186 can provide the vehicle boarding information, the vehicle driving information, and a body information notification function.

For example, based on the information obtained from the sensor part 183 or the second electronic device, the second control part 186 can obtain the rotation state (e.g., a left turn or a right turn), the braking state, the window state (e.g., window opened or closed), the door state (e.g., door opened or close), the driving path, the driving time, and the driving direction of the running or stopped vehicle, and provide the obtained information to the display part 181 of the first electronic device 101 or a pre-registered external device. For example, the second control part 186 can obtain calorie consumption information of the user by detecting the vehicle rotation and braking based on the information detected by the sensor part 183, and provide the obtained information to the display part 181 of the first electronic device 101 or a pre-registered external device. For example, the second control part 186 can obtain user fatigue information by detecting the vehicle rotation and braking (e.g., a quick turn, a sudden brake) based on the information detected by the sensor part 183, and provide the obtained information to the display part 181 of the first electronic device 101 or a pre-registered external device. For example, the second control part 186 can determine the fatigue increase when the driving time or the driving distance increases and the number of quick turns or sudden brakes increases.

The second control part 186 can control the vehicle application according to the control command input from the user through the input part 180 while the vehicle application is running. Further, when the first electronic device 101 and the second electronic device are linked via the communication part 184, the second control part 186 may control the vehicle application according to a remote command received from the second electronic device.

The second control part 186 can exit the running vehicle application according to a signal received from the first control part 185. For example, when the first control part 185 determines the user disembarking, the second control part 186 can exit the running vehicle application and/or the function based on the signal from the first control part 185. When the communication through the communication part 184 is disconnected from the second electronic device, the second control part 186 may exit the running vehicle application and/or the function based on the signal from the first control part 185.

When receiving the signal from the first control part 185 according to the user disembarking or the communication disconnection from the electronic device, the second control part 186 can store at least one of the location information, for example, the location coordinates and the altitude information detected by the GPS module in the memory part 182 and then exit the vehicle application and/or the function. Herein, the location information stored in the memory part 182 can be used to track the vehicle location through the first electronic device 101.

The second control part 186 can request the first control part 185 to check the signal strength of the second electronic device (e.g., a wearable device, the OBD, the car kit) linked by the communication part 184. In so doing, the second control part 186 can receive the distance information based on the RSSI change from the first control part 185, and request to check the vehicle state based on the received distance information or conduct the leave-behind notification function for the first electronic device 101. For example, when a distance difference of the wearable device exceeds a threshold after the vehicle driving, the second control part 186 can output an alarm using the leave-behind notification function for the first electronic device 101. The alarm can be output as an alarm sound through the first electronic device 101. The alarm can be output as a warning light or an alarm sound through the wearable device and/or the first electronic device 101, and may be displayed as an alarm message on a screen of the wearable device.

When the distance difference of the wearable device exceeds the threshold after the vehicle driving, the second control part 186 can request the second electronic device to check the vehicle state. The second electronic device can check the doors, the windows, lights, the engine ignition, and gears of the vehicle according to the request of the second control part 186, and provide results to the first electronic device 101. The second control part 186 can output an alarm based on the vehicle status check results from the second electronic device. The second control part 186 may send the vehicle status check results from the second electronic device, to a pre-registered external device.

The second control part 186 can control vehicle application execution screen output. The second control part 186 can operate the first electronic device 101 as a sub-display of the second electronic device. For example, the second control part 186 can control the first electronic device 101 to output information relating to at least part of the operations of the second electronic device.

The second control part 186 can control the first electronic device 101 based on the vehicle state. Based on the vehicle state and an operation state of the first electronic device 101, the second control part 186 can control the first electronic device 101. For example, the operation state of the first electronic device 101 can include an output mode. The second control part 186 can confirm the window opening based on the information obtained by the sensor part 183 and change the output mode so as not to expose the sound output to a speaker of the second electronic device to the outside.

The second control part 186 can change an algorithm for processing movement information. For example, the second control part 186 can obtain the sensor value through the sensor part 183, and use the sensor value differently according to the communication connection or disconnection of the second electronic device. For example, when the communication is not connected to the second electronic device, the second control part 186 can use the sensor value to determine a travel distance (e.g., a pedometer function) or proximity (e.g., an auto screen). For example, when the communication is connected to the second electronic device, the second control part 186 can use the sensor value to check the vehicle state (e.g., to determine the body motion for checking the vehicle steering or the sudden braking).

Figure 1C:
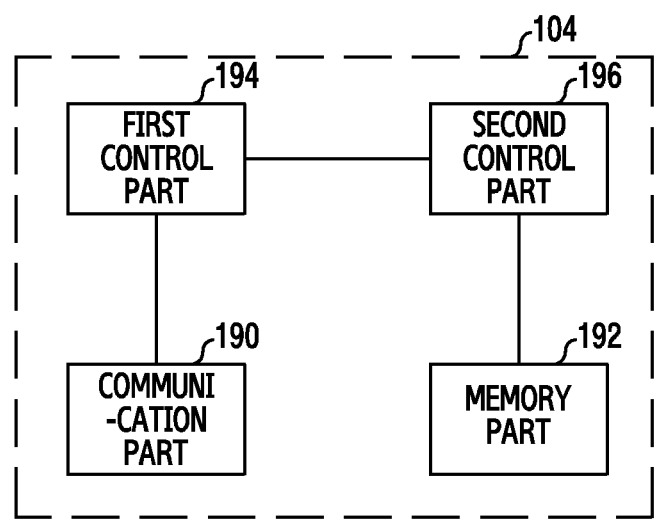
FIG. 1C illustrates a second electronic device according to an embodiment of the present disclosure.

FIG. 1C depicts a second electronic device according to an embodiment of the present disclosure.

The second electronic device can configure the electronic device 102 and 104 of FIG. 1A. For example, the second electronic device 104 can include an OBD, a car kit (e.g., a vehicle head unit), an electronic device electrically connected to the vehicle, and a wearable device.

The second electronic device 104 can include a communication part 190, a first control part 194, a second control part 196, and a memory part 192.

The communication part 190 can support a wireless communication interface of the second electronic device 104. The communication part 190 can include a WLAN module for supporting the short-range communication of the first electronic device 101 in vicinity. The WLAN module can support various short-range communications, for example, BLE and Bluetooth.

The communication part 190 can be linked to the first electronic device 101 by paging the first electronic device 101 using BLE and/or Bluetooth. In so doing, the communication part 190 can broadcast the beacon including the vehicle application identifier, and receive the information about the vehicle identifier and the vehicle application setting value from the first electronic device 101 receiving the beacon. The communication part 190 may send a control command generated based on the vehicle identifier and the vehicle application setting value received from the first electronic device 101, to the first electronic device 101.

The communication part 190 can include a first communication part and a second communication part according to the short-range communication method. Herein, the first communication part can support one of BLE and Bluetooth, and the second communication part can support the other. For example, the first communication part can broadcast the beacon using BLE and receive the vehicle identifier and vehicle application setting value information from the first electronic device 101. The second communication part can send the control command generated based on the vehicle identifier and the vehicle application setting value received from the first electronic device 101, to the first electronic device 101 using Bluetooth. The second communication part can operate when the first communication part receives the vehicle identifier and the vehicle application setting value information of the first electronic device 101. Notably, only one of the first communication part and the second communication part may send and receive signals between the second electronic device 104 and the first electronic device 101.

The memory part 192 can store a setting value for the operation of the second electronic device 104, and a program and an algorithm for the vehicle diagnostics of the second electronic device 104.

The memory part 192 can store information for connecting the communication to the first electronic device 101, for example, a MAC address, a device identifier, a vehicle identifier, a vehicle application identifier (e.g., a service UUID), and authentication information (e.g., personal authentication information including digits or combining digits and characters, personal authentication information such as fingerprint or voice) of the second electronic device 104. The memory part 192 can store information generating in the communication with the first electronic device 101, for example, the MAC address, the device identifier, the vehicle identifier (e.g., MyCar ID) registered to the first electronic device 101, and the vehicle application setting value of the first electronic device 101.

The first control part 194 controls to broadcast the beacon including the vehicle application identifier (e.g., a service UUID) through the communication part 190. The first control part 194 can control the communication between the communication part 190 and the first electronic device 101 based on the signal received from the first electronic device 101 in response to the beacon.

In so doing, the first control part 194 can determine the communication method of the communication part 190 to broadcast the beacon or to establish a communication link with the first electronic device 101. For example, the first control part 194 can control to broadcast the beacon using a first communication method (e.g., Bluetooth) and to establish a communication link with the first electronic device 101 using the first communication method based on a signal received from the first electronic device 101. For example, the first control part 194 can control to broadcast the beacon using a first communication method (e.g., BLE) and to establish a communication link with the first electronic device 101 using a second communication method (e.g., Bluetooth) based on a signal received from the first electronic device 101.

The first control part 194 can provide communication state information of the first electronic device 101, to the second control part 196. For example, when the communication is connected to the first electronic device 101, the first control part 194 can provide the communication information to the second control part 196. In response to the beacon, the first control part 194 provides the vehicle identifier and vehicle application setting value information received from the first electronic device 101, to the second control part 196.

The first control part 194 can control to send the control command generated based on the vehicle identifier and the vehicle application setting value, to the first electronic device 101 through the communication part 190. For example, the control command sent from the first control part 194 to the first electronic device 101 can be the control command generated by the second control part 196. The first control part 194 can provide the vehicle application information executed by the first electronic device 101, to the second control part 196, and provide vehicle application exit information to the second control part 196. When the communication is disconnected from the first electronic device 101, the first control part 194 can provide the disconnection information to the second control part 196.

Upon receiving the vehicle identifier and vehicle application setting value information from the first control part 194, the second control part 196 can control the first electronic device 101 based on the vehicle identifier and the vehicle application setting value.

For example, the second control part 196 can compare the vehicle identifier received from the first electronic device 101 with the vehicle identifier of the second electronic device 104 and thus recognize whether the corresponding vehicle is the vehicle of the user of the first electronic device 101. Based on the vehicle application setting value received from the first electronic device 101, the second control part 196 can confirm an auto launch function of the vehicle application of the first electronic device 101. In so doing, when the communication is connected between the second electronic device 104 and the first electronic device 101, the second control part 196 can generate a command for controlling the vehicle application based on the vehicle identifier and the vehicle application setting value. The second control part 196 can generate a control command for the first electronic device 101 based on the authentication with the first electronic device 101. The command generated by the second control part 196 can be provided to the first electronic device 101 through the first control part 194 and used for the vehicle application function.

The second control part 196 can check the vehicle state according to the request of the first electronic device 101. For example, when the first electronic device 101 detects the user disembarking, the second control part 196 can check the vehicle door opening or closing, the window opening or closing, the light turned on or off, the engine start or stop, the vehicle rotation, and the gears. The second control part 196 can check any abnormal states in the vehicle when the user disembarks from the vehicle. For example, when the first electronic device 101 detects the vehicle driving, the second control part 196 can check information relating to the rotation state (e.g., a (quick) left turn or a (quick) right turn), the (sudden) braking state, the window state (e.g., window opening or closing), the door state (e.g., door opening or closing), the driving path, the driving time, and the driving direction of the running vehicle.

The vehicle state information confirmed through the second control part 196 can be provided from the first control part 194 to the first electronic device 101 so that the user can recognize the abnormal state of the vehicle.

The second control part 916 can obtain information of at least part of the operations of the second electronic device 104 and provide the information to the second electronic device 104.

Although not depicted here, the second electronic device 104 may include a sensor for collecting information to determine the movement or the state of the second electronic device 104 or the vehicle.

Although the first electronic device and the second electronic device are described with specificity with respect to FIGS. 1B and 1C, a skilled artisan will understand that first electronic device and second electronic device are interchangeable.

Figure 2:
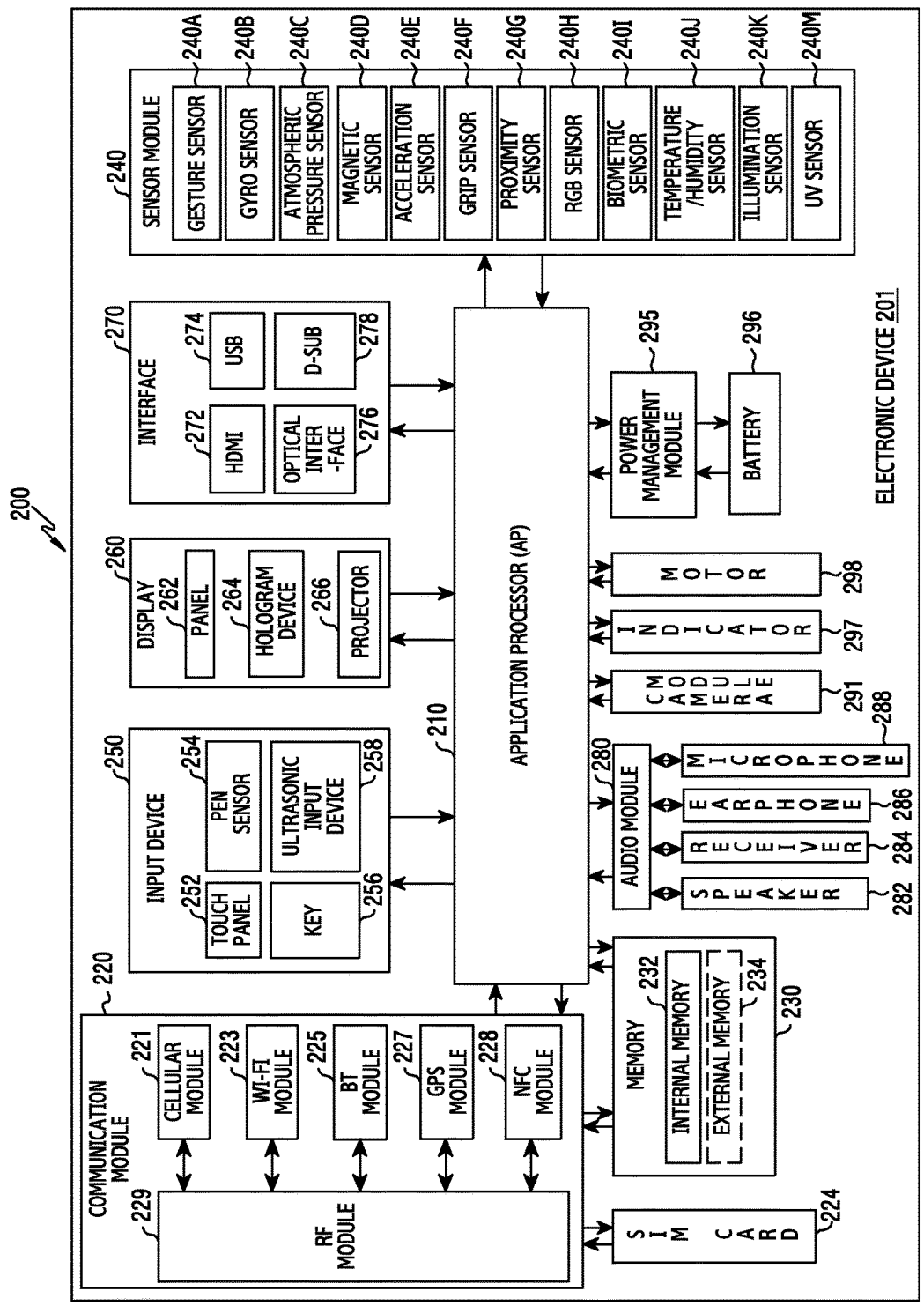
FIG. 2 illustrates an electronic device according to an embodiment of the present disclosure.

FIG. 2 is a block diagram 200 illustrating an electronic device 201 according to various embodiments of the present disclosure. The electronic device 201 may configure, for example, all or a portion of the electronic devices 101, 102, or 104 illustrated in FIG. 1. Referring to FIG. 2, the electronic device 201 may include one or more application processors (AP) 210, a communication module 220, a subscriber identification module (SIM) card 224, a memory 230, a sensor module 240, an input unit 250, a display 260, an interface 270, an audio module 280, a camera module 291, a power management module 295, a battery 296, an indicator 297, or a motor 298.

The AP 210 may drive an OS or an application to control a plurality of hardware or software elements connected to the AP 210, and perform various data processes including multimedia data and operations. The AP 210 may be implemented, for example, as a system on chip (SoC). According to an embodiment, the AP 210 may further include a graphic processing unit (GPU) (not shown). In certain embodiments, the AP 210 may execute the vehicle application.

The communication module 220 (e.g., the communication interface 160) may perform data transmission/reception in communication between the electronic device 201 (e.g., the electronic device 21) and other electronic devices (e.g., the electronic device 24 or the server 26) connected via a network. According to an embodiment, the communication module 220 may include a cellular module 221, a Wi-Fi module 223, a BT module 225, a GPS module 227, an NFC module 228, and a Radio Frequency (RF) module 229.

The cellular module 221 may provide voice communication, image communication, a short message service, or an Internet service, etc. via a communication network (e.g., LTE, LTE-A, CDMA, WCDMA, UMTS, WiBro, or GSM, etc.). Also, the cellular module 221 may perform discrimination and authentication of an electronic device within a communication network using, for example, a subscriber identify module (e.g., a SIM card 224). According to an embodiment, the cellular module 221 may perform at least a portion of functions that may be provided by the AP 210. For example, the cellular module 221 may perform at least a portion of a multimedia control function.

According to an embodiment, the cellular module 221 may include a communication processor (CP). Also, the cellular module 221 may be, for example, implemented as a SoC. Though elements such as the cellular module 221 (e.g., a communication processor), the memory 230, or the power management module 295, etc. are illustrated as elements separated from the AP 210 in FIG. 2, according to an embodiment, the AP 210 may be implemented to include at least a portion (e.g., the cellular module 221) of the above-described elements.

According to an embodiment, the AP 210 or the cellular module 221 (e.g., a communication processor) may load an instruction or data received from at least one of a non-volatile memory and other elements connected thereto onto a volatile memory, and process the same. Also, the AP 210 or the cellular module 221 may store data received from at least one of other elements or generated by at least one of other elements in a non-volatile memory.

Each of the Wi-Fi module 223, the BT module 225, the GPS module 227, or the NFC module 228 may include, for example, a processor for processing data transmitted/received via a relevant module. Though the cellular module 221, the Wi-Fi module 223, the BT module 225, the GPS module 227, or the NFC module 228 are illustrated as separate blocks in FIG. 2, according to an embodiment, at least a portion (e.g., two or more elements) of the cellular module 221, the Wi-Fi module 223, the BT module 225, the GPS module 227, or the NFC module 228 may be included in one Integrated Circuit (IC) or an IC package. For example, at least a portion (e.g., a communication processor corresponding to the cellular module 221 and a Wi-Fi processor corresponding to the Wi-Fi module 223) of processors corresponding to each of the cellular module 221, the Wi-Fi module 223, the BT module 225, the GPS module 227, or the NFC module 228 may be implemented as one SoC.

The RF module 229 may perform transmission/reception of data, for example, transmission/reception of an RF signal. The RF module 229 may include, for example, a transceiver, a power amp module (PAM), a frequency filter, or a low noise amplifier (LNA), etc., though not shown. Also, the RF module 229 may further include a part for transmitting/receiving an electromagnetic wave on a free space in wireless communication, for example, a conductor or a conducting line, etc. Though FIG. 2 illustrates the cellular module 221, the Wi-Fi module 223, the BT module 225, the GPS module 227, and the NFC module 228 share one RF module 229, according to an embodiment, at least one of the cellular module 221, the Wi-Fi module 223, the BT module 225, the GPS module 227, or the NFC module 228 may perform transmission/reception of an RF signal via a separate RF module. In certain embodiments, the communication module 220 may be used to establish communication with another electronic device.

The SIM card 224 may be a card including a subscriber identify module, and may be inserted into a slot formed in a specific position of the electronic device. The SIM card 224 may include unique identify information (e.g., integrated circuit card identifier (ICCID)) or subscriber information (e.g., international mobile subscriber identity (IMSI)).

The memory 230 (e.g., the memory 20) may include a built-in memory 232 or an external memory 234. The built-in memory 232 may include, for example, at least one of a volatile memory (e.g., dynamic RAM (DRAM), static RAM (SRAM), synchronous dynamic RAM (SDRAM)) and a non-volatile memory (e.g., one time programmable ROM (OTPROM), programmable ROM (PROM), erasable and programmable ROM (EPROM), electrically erasable and programmable ROM (EEPROM), mask ROM, flash ROM, NAND flash memory, NOR flash memory, etc.).

According to an embodiment, the built-in memory 232 may be a Solid State Drive (SSD). The external memory 234 may further include a flash drive, for example, compact flash (CF), secure digital (SD), micro secure digital (Micro-SD), mini secure digital (Mini-SD), extreme digital (xD), or a memory stick. The external memory 234 may be functionally connected with the electronic device 201 via various interfaces. According to an embodiment, the electronic device 201 may further include a storage device (or a storage medium) such as a hard drive. Memory 230 can store information generated in the communication between the first electronic device 101 and the second electronic device, for example, a Media Access Control (MAC) address, a device identifier, a vehicle identifier (e.g., MyCar ID), a vehicle application identifier (e.g., a service Unique User Identifier (UUID)), and an application setting value. The memory 230 may store information for establishing communication with another electronic device.

The sensor module 240 may measure a physical quantity or detect an operation state of the electronic device 201, and convert the measured or detected information to an electric signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., RGB (red, green, blue) sensor), a living body sensor 240I, a temperature/humidity sensor 240J, an illuminance sensor 240K, or an ultra violet (UV) sensor 240M. Additionally or alternatively, the sensor module 240 may include, for example, an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), or a fingerprint sensor (not shown), etc. The sensor module 240 may further include a control circuit for controlling at least one sensor belonging thereto. In certain embodiments, the sensor module 240 may comprise sensor part 183.

The input unit 250 may include a touch panel 252, a (digital) pen sensor 254, a key 256, or an ultrasonic input unit 258. The touch panel 252 may recognize a touch input using at least one of capacitive, resistive, infrared, or ultrasonic methods. Also, the touch panel 252 may further include a control circuit. A capacitive touch panel may perform detection by a physical contact or proximity recognition. The touch panel 252 may further include a tactile layer. In this case, the touch panel 252 may provide a tactile reaction to a user.

The (digital) pen sensor 254 may be implemented using, for example, a method which is the same as or similar to receiving a user's touch input, or using a separate sheet for detection. The key 256 may include, for example, a physical button, an optical key or keypad. The ultrasonic input unit 258 is a unit for recognizing data by detecting a sound wave using a microphone (e.g., a microphone 288) in the electronic device 201 via an input tool generating an ultrasonic signal, and enables wireless recognition. According to an embodiment, the electronic device 201 may receive a user input from an external device (e.g., a computer or a server) connected to the communication module 220 using the communication module 220.

The display 260 (e.g., the display 150) may include a panel 262, a hologram device 264, or a projector 266. The panel 262 may be, for example, a liquid crystal display (LCD), or an active-matrix organic light-emitting diode (AM-OLED), etc. The panel 262 may be implemented, for example, such that it is flexible, transparent, or wearable. The panel 262 may be configured as one module together with the touch panel 252. The hologram device 264 may show a three-dimensional image in the air using interferences of light. The projector 266 may project light onto a screen to display an image. The screen may be positioned, for example, inside or outside the electronic device 201. According to an embodiment, the display 260 may further include a control circuit for controlling the panel 262, the hologram device 264, or the projector 266. In certain embodiments, the display 260 can display the information as depicted in FIGS. 9-18 and 20.

The interface 270 may include, for example, a high-definition multimedia interface (HDMI) 272, a universal serial bus (USB) 274, an optical interface 276, or a D-sub-miniature (D-sub) 278. The interface 270 may be included, for example, in the communication interface 160 illustrated in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio module 280 may convert a sound and an electric signal in dual directions. At least a partial element of the audio module 280 may be included, for example, in the I/O interface 140 illustrated in FIG. 1. The audio module 280 may process sound information input or output via, for example, a speaker 282, a receiver 284, an earphone 286, or a microphone 288, etc.

The camera module 291 is a device that may shoot a still image and a moving picture. According to an embodiment, the camera module 291 may include one or more image sensors (e.g., a front sensor or a rear sensor), a lens (not shown), an image signal processor (ISP) (not shown), or a flash (not shown) (e.g., an LED or xenon lamp).

The power management module 295 may manage power of the electronic device 201. Though not shown, the power management module 295 may include, for example, a power management integrated circuit (PMIC), a charger integrated circuit (IC), or a battery or a battery or fuel gauge.

The PMIC may be mounted, for example, inside an integrated circuit or a SoC semiconductor. A charging method may be classified into a wired charging method and a wireless charging method. The charging IC may charge a battery and prevent introduction of an overvoltage or an overcurrent from a charger. According to an embodiment, the charging IC may include a charging IC for at least one of the wired charging method and the wireless charging method. The wireless charging method may be, for example, a magnetic resonance method, a magnetic induction method, or an electromagnetic wave method, etc., and may additionally include an additional circuit for wireless charging, for example, a circuit such as a coil loop, a resonance circuit, or a rectifier, etc.

The battery gauge may measure, for example, a remnant of the battery 296, a voltage, a current, or a temperature while charging. The battery 296 may store or generate electricity, and supply power to the electronic device 201 using the stored or generated electricity. The battery 296 may include, for example, a rechargeable battery or a solar battery.

The indicator 297 may display a specific state of the electronic device 201 or a portion thereof (e.g., the AP 210), for example, a booting state, a message state, or a charging state, etc. The motor 298 may convert an electric signal to mechanical vibration. Though not shown, the electronic device 201 may include a processor (e.g., a GPU) for supporting a mobile TV. The processor for supporting the mobile TV may process media data corresponding to standards, for example, such as digital multimedia broadcasting (DMB), digital video broadcasting (DVB), or a media flow, etc.

Figure 3:
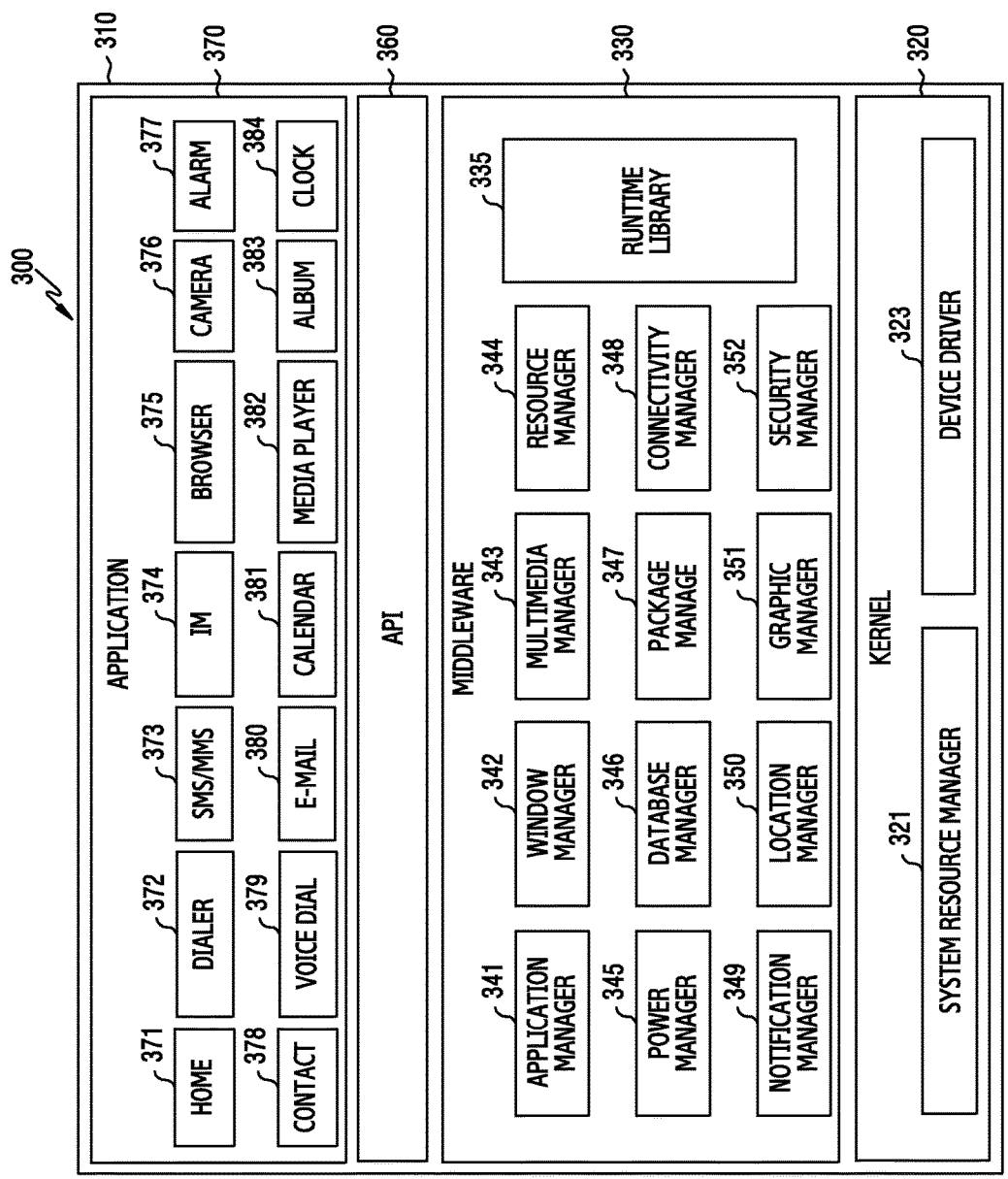
FIG. 3 illustrates a programming module according to an embodiment of the present disclosure.

FIG. 3 is a block diagram 300 of a program module 310 according to various embodiments of the present disclosure.

According to an embodiment, the program module 310 (for example, the programs 140) may include an Operating System (OS) for controlling resources related to the electronic device (for example, the electronic device 100) and/or various applications (for example, the application programs 147) executed in the operating system. The operating system may be, for example, Android, iOS, Windows, Symbian, Tizen, Bada, or the like.

The programming module 310 may include a kernel 320, middleware 330, an API 360, and/or applications 370. At least some of the program module 310 may be preloaded in the electronic device or downloaded from the server. In certain embodiments, the applications 370 can include vehicle applications.

The kernel 320 (for example, the kernel 141 of FIG. 1) may include, for example, a system resource manager 331 or a device driver 333. The system resource manager 331 may control, allocate, or collect the system resources. According to an embodiment, the system resource manager 331 may include a process management unit, a memory management unit, or a file system management unit. The device driver 333 may include, for example, a display driver, a camera driver, a Bluetooth driver, a shared-memory driver, a USB driver, a keypad driver, a WiFi driver, an audio driver, or an Inter-Process Communication (IPC) driver.

The middleware 330 may provide a function required by the applications 370 in common or provide various functions to the applications 370 through the API 360 so that the applications 370 can efficiently use limited system resources within the electronic device. According to an embodiment, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses to add new functions through a programming language while the application 370 is executed. The runtime library 335 may perform input/output management, memory management, or a function for an arithmetic function.

The application manager 341 may manage, for example, a life cycle of at least one of the applications 370. The window manager 342 may manage Graphical User Interface (GUI) resources used by a screen. The multimedia manager 343 may grasp formats required for the reproduction of various media files, and may perform an encoding or decoding of the media file by using a codec suitable for the corresponding format. The resource manager 344 may manage resources such as a source code, a memory, and a storage space of at least one of the applications 370.

The power manager 345 may operate together with a Basic Input/Output System (BIOS) to manage a battery or power and may provide power information required for the operation of the electronic device. The database manager 346 may generate, search for, or change a database to be used by at least one of the applications 370. The package manager 347 may manage the installation or the updating of applications distributed in the form of package file.

The connectivity manager 348 may manage wireless connection of, for example, Wi-Fi or Bluetooth. The notification manager 349 can display or notify of an event such as an arrival message, promise, proximity notification, and the like in such a way that does not disturb a user. The location manager 350 may manage location information of the electronic device. The graphic manager 351 may manage graphic effects to be provided to a user and user interfaces related to the graphic effects. The security manager 352 may provide all security functions required for system security or user authentication. According to an embodiment, when the electronic device (for example, electronic device 100) has a call function, the middleware 330 may further include a telephony manager for managing a voice call function or a video call function of the electronic device.

The middleware 330 may include a middleware module for forming a combination of various functions of the aforementioned components. The middleware 330 may provide modules specialized according to types of operating systems in order to provide differentiated functions. Further, the middleware 330 may dynamically remove some of the existing components or add new components.

The API 360 (for example, the API 145) is, for example, a set of API programming functions, and a different configuration thereof may be provided according to an operating system. For example, Android or iOS may provide one API set per platform, and Tizen may provide two or more API sets per platform.

The applications 370 (for example, the application programs 147) may include, for example, one or more applications which can provide functions such as home 371, dialer 372, SMS/MMS 373, Instant Message (IM) 374, browser 375, camera 376, alarm 377, contacts 378, voice dialer 379, email 380, calendar 381, media player 382, album 383, clock 384, health care (for example, measure exercise quantity or blood sugar), or environment information (for example, atmospheric pressure, humidity, or temperature information).

According to an embodiment, the applications 370 may include an application (hereinafter, referred to as an "information exchange application" for convenience of the description) supporting information exchange between the electronic device (for example, the electronic device 100) and an external electronic device. The information exchange application may include, for example, a notification relay application for transferring predetermined information to an external electronic device or a device management application for managing an external electronic device.

For example, the notification relay application may include a function of transferring, to the external electronic device, notification information generated from other applications of the electronic device 100 (for example, an SMS/MMS application, an e-mail application, a health management application, or an environmental information application). Further, the notification relay application may receive notification information from, for example, a control device and provide the received notification information to the user. The device management application may manage (for example, install, delete, or update), for example, a function for at least a part of the external electronic device communicating with the electronic device (for example, turning on/off the external electronic device itself (or some elements thereof) or adjusting brightness (or resolution) of a display), applications executed in the external electronic device, or services provided from the external electronic device (for example, a telephone call service or a message service).

According to an embodiment, the applications 370 may include an application (for example, health management application) designated according to attributes of the external electronic device (for example, attributes of the electronic device such as the type of electronic device which corresponds to a mobile medical device). According to an embodiment, the applications 370 may include an application received from the external electronic devices (for example, the server or the electronic device). According to an embodiment, the applications 370 may include a pre-loaded application or a third party application which can be downloaded from the server. The names of the components of the program module 310 according to the embodiment illustrated in FIG. 3 may vary according to the type of operating system.

According to various embodiments, at least some of the programming module 310 may be implemented by software, firmware, hardware, or a combination of two or more thereof. At least some of the programming module 310 may be implemented (for example, executed) by, for example, the processor (for example, the application program). At least some of the programming module 310 may include, for example, a module, program, routine, sets of instructions, or process for performing one or more functions.

A first electronic device can include a communication part, and a control part for providing device identification information to a second electronic device based on a beacon received from the second electronic device through the communication part, and conducting at least one function corresponding to the signal received from the second electronic device.

The beacon received from the second first electronic device can include vehicle service identification information.

The control part can send device identification information comprising at least one of a device identifier, a vehicle identifier, and a vehicle application setting value, to the second electronic device.

The control part can provide the device identification information to the second electronic device based on the beacon received using a first communication method, and receive a signal for controlling the at least one function corresponding to the device identification information from the second electronic device using a second communication method.

When measuring user body information based on at least one of a vehicle movement, a movement of the first electronic device, and a body motion according to the signal received from the second electronic device in response to the device identification information, the control part can output the measured body information.

When a disembarking pattern is detected, the control part can receive steering rotation information from the second electronic device and output the received steering rotation information.

When detecting a vehicle estate based on the signal received from the second electronic device in response to the device identification information, the control part can control the first electronic device according to the vehicle state.

The first electronic device can further include a sensor part. When detecting communication connection to the second electronic device based on a signal received from the second electronic device in response to the device identification information, the control part can use a sensor value collected by the sensor part in a first manner. When detecting communication disconnection from the second electronic device, the control part can use a sensor value collected by the sensor part in a second manner.

When detecting communication connection to the second electronic device based on the signal received from the second electronic device in response to the device identification information, the control part can output information relating to at least part of operations of the second electronic device, through the first electronic device.

A second electronic device can include a communication part, and a control part for providing a beacon comprising vehicle application identification information according to a search of a first electronic device, and providing, using device identification information received from the another electronic device, the first electronic device with a signal for executing of first electronic device.

The control part can receive authentication information from the first electronic device, and provide, based on the authentication information received from the first electronic device, the first electronic device with the signal.

The control part can output information of at least one function executed in the second electronic device, through the first electronic device.

Figure 4A:
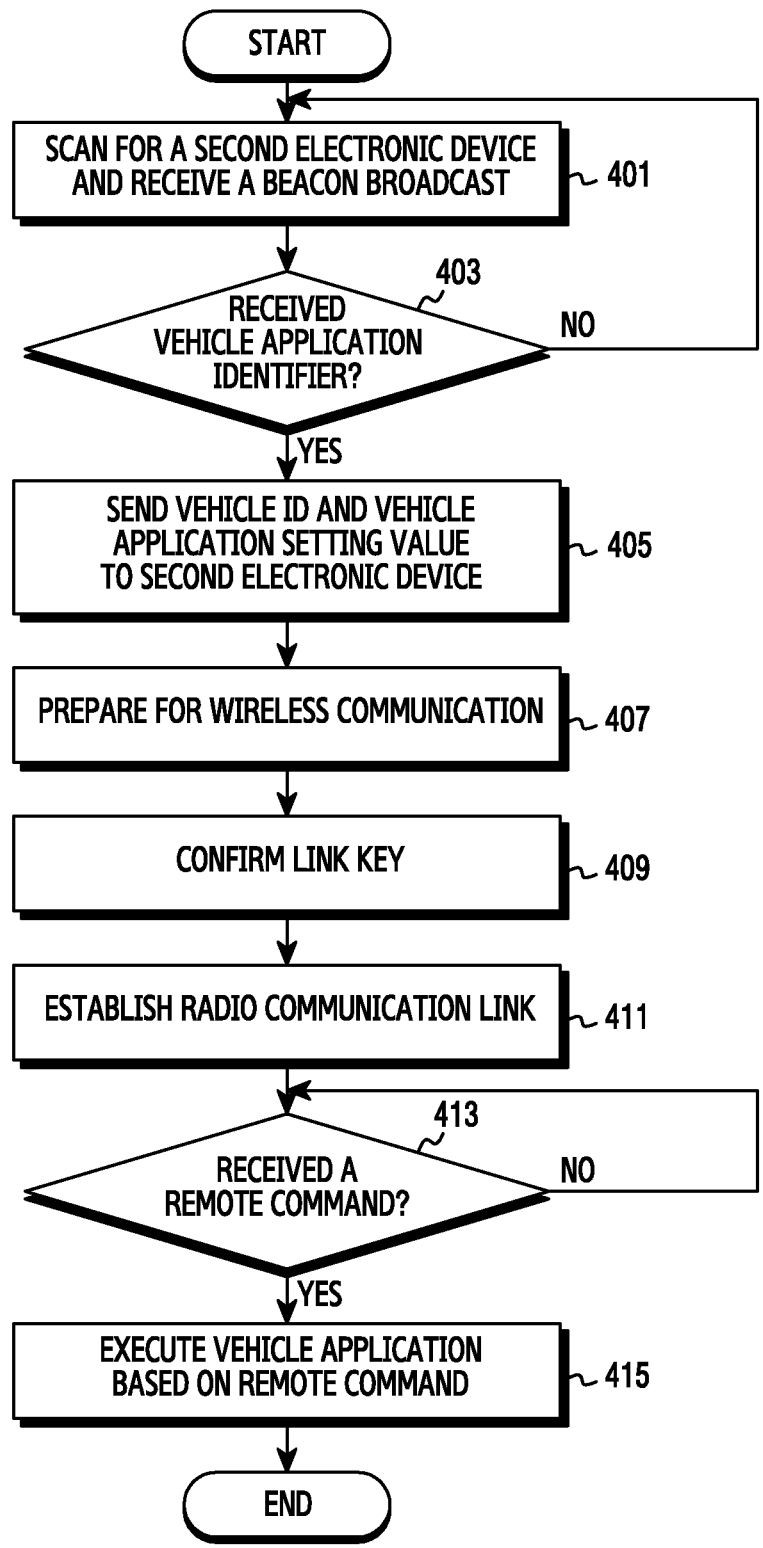
FIG. 4A illustrates operations of a first electronic device according to an embodiment of the present disclosure.

FIG. 4A is a flowchart of operations of a first electronic device according to an embodiment of the present disclosure.

In operation 401, the first electronic device can scan for a second electronic device in vicinity of the first electronic device and receive a beacon broadcast from the second electronic device.

In operation 403, the first electronic device can determine whether a vehicle application identifier is received from the second electronic device. The second electronic device can broadcast the beacon including the vehicle application identifier, and the first electronic device can determine whether the received beacon includes the vehicle application identifier.

In operation 405, the first electronic device can identify a vehicle application installed or stored therein based on the received vehicle application identifier, and send a vehicle identifier registered to the vehicle application and a vehicle application setting value to the second electronic device. The vehicle application setting value can be related to information of the application executed in the first electronic device.

In operation 407, the first electronic device can prepare for wireless communication. For example, when sending the vehicle identifier and the vehicle application setting value to the second electronic device using the first communication method (e.g., BLE), the first electronic device can prepare for the communication with the second electronic device using the second communication method (e.g., Bluetooth). The first electronic device can confirm a link key received from the second electronic device in operation 409 and establish a radio link with the second electronic device in operation 411. When the wireless link is established, the first electronic device waits until it has received a remote command from the second electronic device in operation 413.

In operation 415, the first electronic device can execute the vehicle application based on the remote command received from the second electronic device.

The vehicle application execution can conduct a function corresponding to the vehicle application setting value according to the remote command of the second electronic device. For example, the function can provide the vehicle state information, provide the user body information (e.g., calorie consumption information, fatigue information), operate the first electronic device as the sub-display, and control the first electronic device based on the vehicle state.

The first electronic device can repeat the operations 413 and 415 until the vehicle application is exited or the communication is disconnected from the electronic device.

Figure 4B:
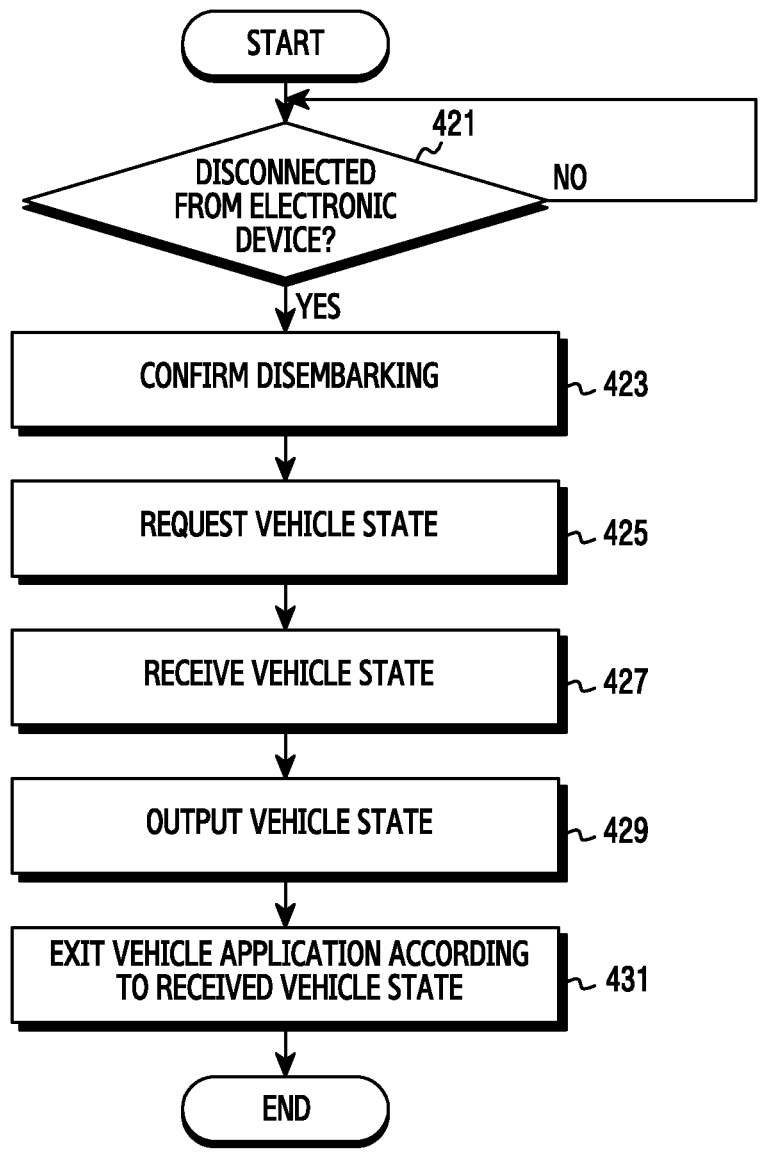
FIG. 4B illustrates operations of a first electronic device according to an embodiment of the present disclosure.

FIG. 4B is a flowchart of operations of a first electronic device according to an embodiment of the present disclosure.

In operation 421, the first electronic device can determine whether the second electronic device is disconnected during the vehicle application execution.

The first electronic device can determine whether the second electronic device is disconnected by monitoring the communication part through the first control part.

When the second electronic device is disconnected, the first electronic device can confirm that its user disembarks from the vehicle in operation 423. The first electronic device may detect the user disembarking by monitoring the sensor part through the first control part.

In operation 425, the first electronic device can request the vehicle state from the second electronic device. The first electronic device can receive the vehicle state information from the second electronic device in operation 427, and output the received vehicle state information in operation 429. In operation 431, the first electronic device can exit the vehicle application according to the received vehicle state information.

Figure 5:
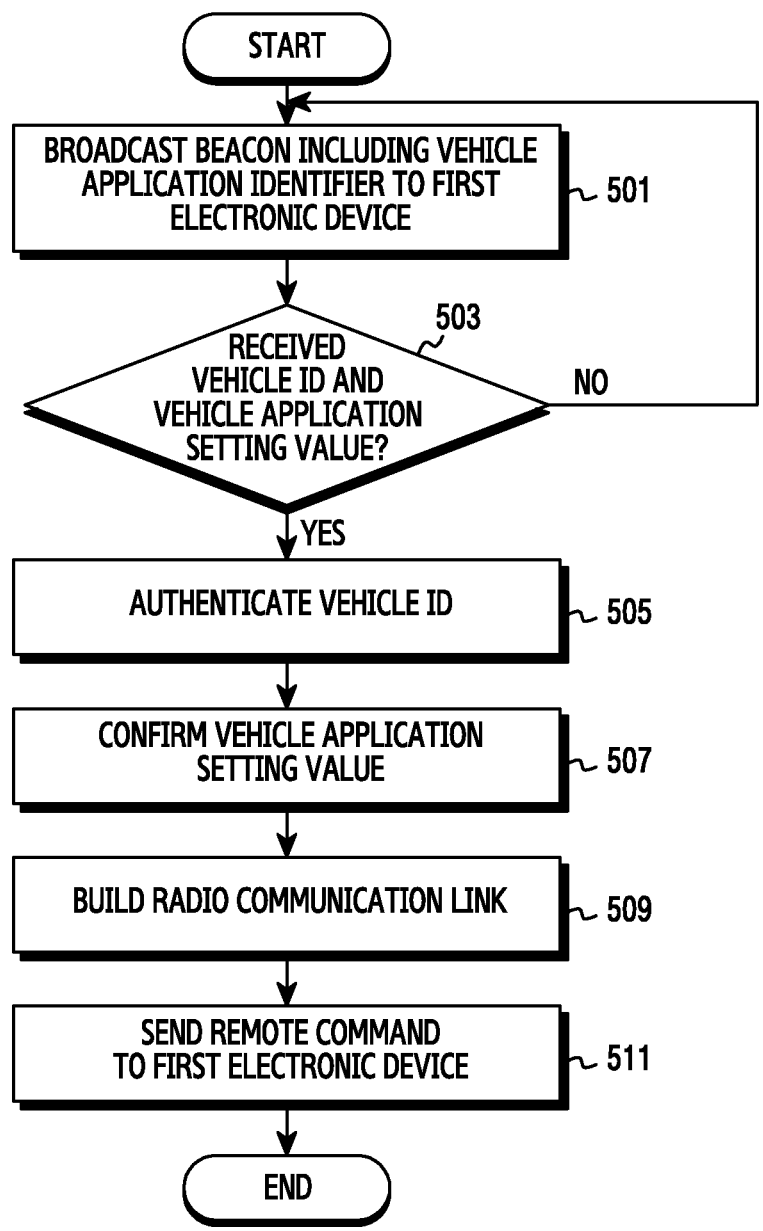
FIG. 5 illustrates operations of a second electronic device according to an embodiment of the present disclosure.

FIG. 5 is a flowchart of operations of a second electronic device according to an embodiment of the present disclosure.

In operation 501, the second electronic device can broadcast a beacon including a vehicle application identifier (e.g., service UUID) to a first electronic device in vicinity.

In operation 503, the second electronic device waits until it has received a vehicle identifier and a vehicle application setting value corresponding to the vehicle application identifier of the beacon from the first electronic device.

In operation 505, the second electronic device can obtain the vehicle identifier received from the first electronic device. The second electronic device can compare the vehicle identifier received from the first electronic device with a vehicle identifier stored in the second electronic device and thus recognize whether the corresponding vehicle is a vehicle of the first electronic device. The second electronic device can perform the authentication with the first electronic device in order to verify the vehicle or the user of the first electronic device.

In operation 507, the second electronic device can recognize an auto launch function set in the vehicle application of the first electronic device by confirming the vehicle application setting value received from the electronic device. The second electronic device can generate a remote command for controlling the vehicle application of the first electronic device based on the vehicle identifier and the vehicle application setting value.

In operation 509, the second electronic device can build a radio communication link for sending and receiving signals to and from the first electronic device.

Figure 6:
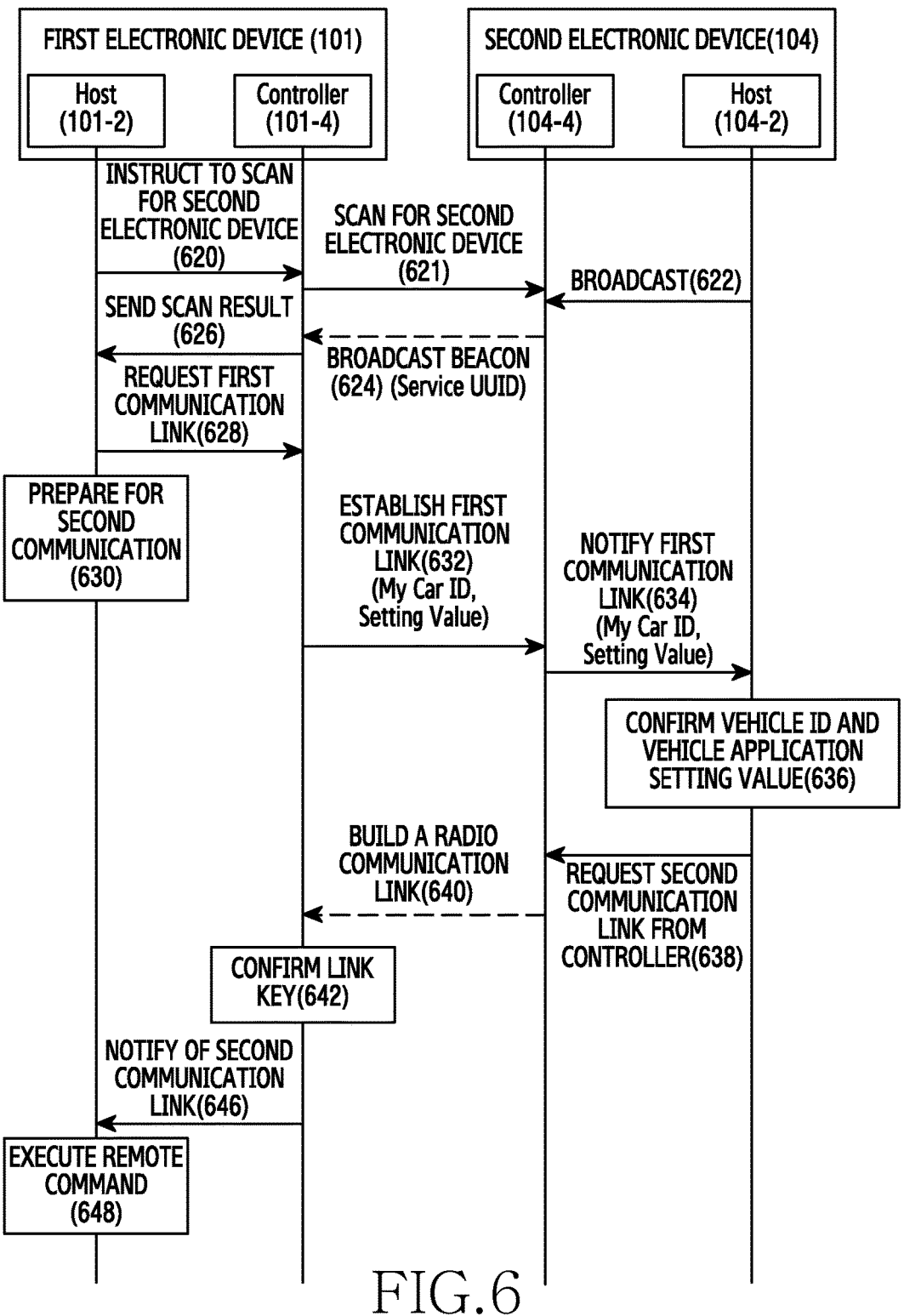
FIG. 6 is a signal flow diagram for starting a vehicle application on a first electronic device from a second electronic device, according to an embodiment of the present disclosure.

In operation 511, the second electronic device sends the remote command for executing the vehicle application to the first electronic device in the built radio communication link. FIG. 6 is a signal flow diagram for starting a vehicle application on a first electronic device 101 from a second electronic device 104, according to the present disclosure. A host 101-2 of the first electronic device 101 can correspond to the second control part 186 of FIG. 1B, and a controller 101-4 can correspond to the first control part 185 of FIG. 1B. The second electronic device 104 can correspond to at least one of the OBD and the car kit. A host 104-4 of the second electronic device 104 can correspond to the second control part 196 of FIG. 1C, and a controller 104-2 can correspond to the first control part 194 of FIG. 1C.

The host 101-2 of the first electronic device 101 can instruct the controller 101-4 to scan for the second electronic device 104 in the vicinity of the first electronic device 101 in operation 620. The controller 101-4 of the first electronic device 101 scans the second electronic device 104 according to the instruction of the host 101-2 in operation 621.

The host 104-4 of the second electronic device 104 can instruct the controller 104-2 to broadcast a beacon in operation 622. The controller 104-2 of the second electronic device 104 can broadcast a beacon including a vehicle application identifier (e.g., service UUID) to the first electronic device 101 according to the instruction of the host 104-4 in operation 624.

When receiving the beacon including the vehicle application identifier in operation 624, the controller 101-4 of the first electronic device 101 can send the scan result of the second electronic device 104 to the host 101-2 of the first electronic device 101 in operation 626. Herein, host 101-2 instructs controller 101-4 to request a first communication link with the second electronic device 104 based on the scan result of the second electronic device 104 in operation 628, and prepares for a second communication in operation 630. In operation 632, the controller 101-4 of the first electronic device 101 can establish the first communication link with the second electronic device 104 by responding to the beacon of operation 624 with the vehicle application identifier (e.g., MyCar ID) and the vehicle application setting value according to the request of the host 101-2.

The controller 104-2 of the second electronic device 104 can inform the host 104-4 of the first communication link with the first electronic device 101 in operation 634, and forward the vehicle identifier and the vehicle application setting value received from the first electronic device 101 to the host 104-4 in operation 632. The host 104-4 of the second electronic device 104 can confirm the vehicle identifier and the vehicle application setting value received from the first electronic device 101 in operation 636. For example, the host 104-4 of the second electronic device 104 can determine whether the corresponding vehicle is a vehicle of the user of the first electronic device 101 by comparing the vehicle identifier received from the first electronic device 101 with its vehicle identifier, and recognize the auto launch function set in the vehicle application of the first electronic device 101 by confirming the vehicle application setting value received from the first electronic device 101. In so doing, the second electronic device 104 can generate an instruction for controlling the vehicle application based on the vehicle identifier and the vehicle application setting value.

The host 104-4 of the second electronic device 104 requests a second communication link with the first electronic device 101 from the controller 104-2 in operation 638. The controller 104-2 builds a radio communication link (second communication link) for carrying signals between the second electronic device 104 and the first electronic device 101 in operation 640. For example, the second communication link can include a remote command from the second electronic device to the first electronic device. Moreover, in certain embodiments, the first communication link established during operation 632 can be according to a first communication method, while the second communication link during operation 640 can be according to a second method. The controller 101-4 of the first electronic device 101 finishes the communication link establishment with the second electronic device 104 by confirming the link key received from the second electronic device 104 in operation 642, and informs the host 101-2 of the second communication link in operation 646.

When receiving the remote command for the vehicle application from the second electronic device 104 in the second communication link built in operation 640, the host 101-2 of the first electronic device 101 executes the corresponding remote command in operation 648.

Herein, operation 624 and operation 632 can be conducted using the first communication method, for example, BLE, and operation 640 can be conducted using the second communication method, for example, Bluetooth. Notably, all of operations 624, 632, and 640 may be conducted using one of the first communication method and the second communication method.

Figure 7:
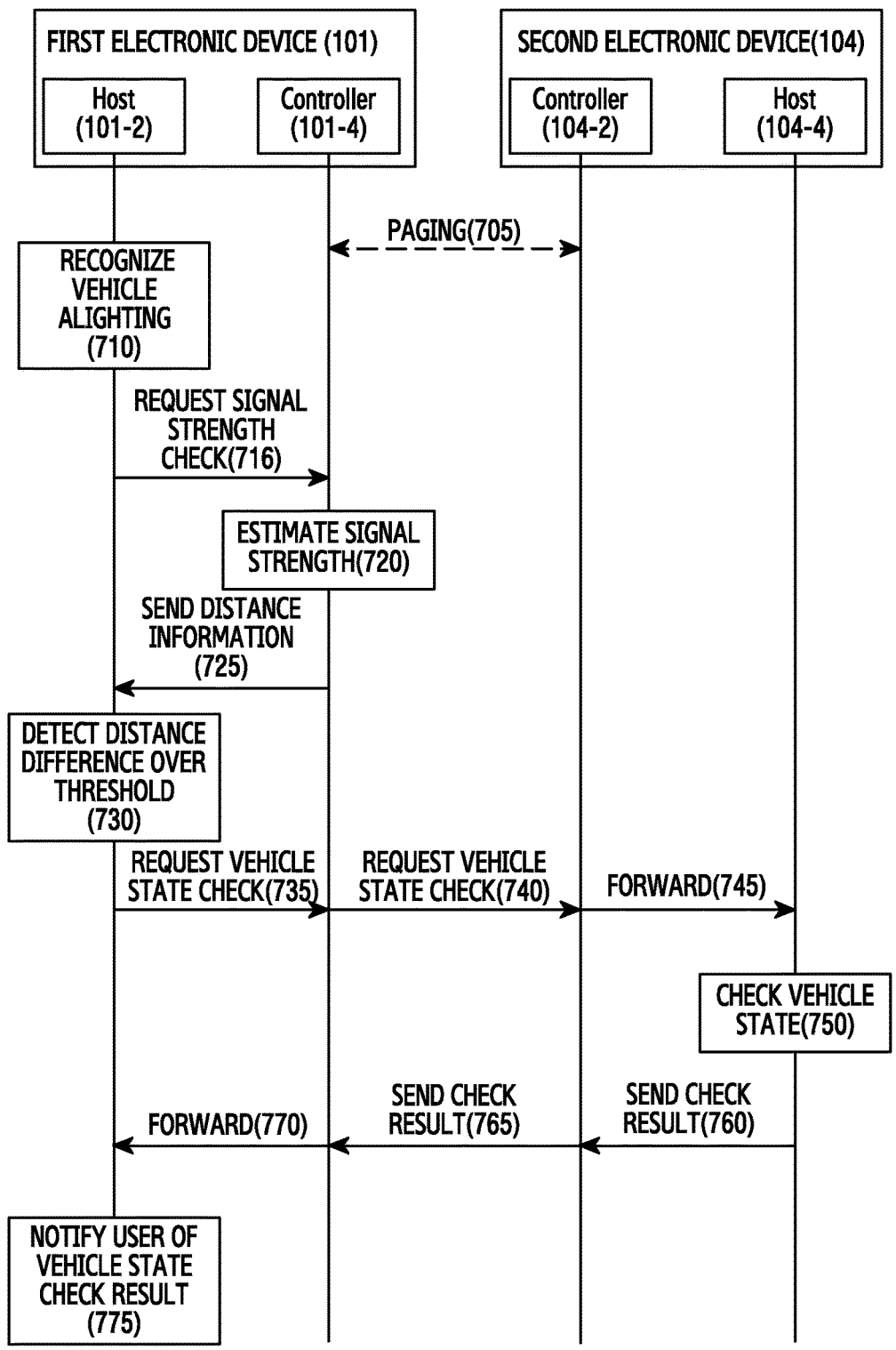
FIG. 7 is a signal flow diagram of a vehicle application exit of a first electronic device according to an embodiment of the present disclosure.

FIG. 7 is a signal flow diagram for a vehicle application exit of a first electronic device according to an embodiment of the present disclosure.

A host 101-2 of the first electronic device 101 can correspond to the second control part 186 of FIG. 1B, and a controller 101-4 can correspond to the first control part 185 of FIG. 1B. The second electronic device 104 can correspond to at least one of the OBD and the car kit, a host 104-2 of the second electronic device 104 can correspond to the second control part 196 of FIG. 1C, and a controller 104-4 can correspond to the first control part 194 of FIG. 1C. The first electronic device 101 and the second electronic device 104 may page each other (operation 705).

When recognizing vehicle disembarking in operation 710, the host 101-2 of the first electronic device 101 can request the controller 101-4 to check the signal strength in operation 716. The controller 101-4 of the first electronic device 101 can estimate the signal strength (e.g., RSSI) between the first electronic device 101 and the second electronic device 104 in operation 720, measure a distance according to the RSS change, and send distance information to the host 101-2 in operation 725.

Upon detecting a distance difference of the first electronic device 101 and the second electronic device 104 over a threshold (operation 730) based on the distance information sent by the controller 101-4 in operation 725, the host 101-2 of the first electronic device 101 requests a vehicle state check from the controller 101-4 in operation 735. The controller 101-4 of the first electronic device 101 can request the second electronic device 104 to check the vehicle state (in operation 740) according to the request of the host 101-2 in operation 735.

When receiving the vehicle state check request from the first electronic device 101 in operation 740, the controller 104-2 of the second electronic device 104 forwards the vehicle state check request to the host 104-4 in operation 745. The host 104-4 checks the vehicle state according to the request of the first electronic device 101 in operation 750. Herein, the host 104-4 of the second electronic device 104 can check the door opening or closing, the window opening or closing, the light turning on or off, the engine start or stop, the steering rotation, and the gears of the vehicle. Upon checking the vehicle state, the controller 104-2 of the second electronic device 104 can provide the vehicle state check result to the controller 104-2 in operation 760. The controller 104-2 can send the vehicle state check result to the first electronic device 101 in operation 765.

The controller 101-4 of the first electronic device 101 forwards the vehicle state check result received from the second electronic device 104 in operation 765, to the host 104-4 in operation 770, during operation 775. The host 101-2 of the first electronic device 101 can notify to the user the vehicle state check result received in operation 770. The host 101-2 of the first electronic device 101 can notify to the user the vehicle state check result received from the second electronic device 104 only when the vehicle state check result is abnormal.

Figure 8:
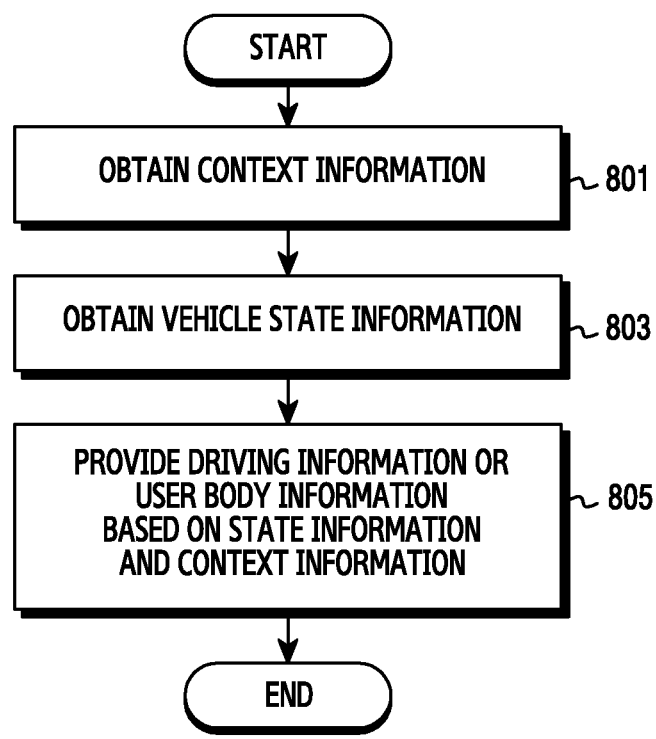
FIG. 8 illustrates a method for running a vehicle application in a first electronic device according to an embodiment of the present disclosure.

FIG. 8 is a flowchart of a method for executing a vehicle application in a first electronic device according to an embodiment of the present disclosure. Referring to FIG. 8, the first electronic device can obtain the vehicle driving information and the user body information (e.g., calorie consumption information, fatigue information).

In operation 801, the first electronic device can obtain context information. The context information can include information indicating one of time, ambient noise, ambient brightness, the movement of the first electronic device, and the vehicle movement. The context information can be collected by the first electronic device or the second electronic device.

In operation 803, the first electronic device can provide vehicle state information. The vehicle state information can include vehicle driving information such as velocity, driving time, Revolution Per Minute (RPM), driving distance, average fuel consumption, and instant fuel consumption, engine information such as engine RPM, coolant temperature, incoming air temperature, incoming air volume, engine oil temperature, transmission oil temperature, injected fuel amount, oxygen sensor voltage, ignition angle, carbon emission amount, and air fuel ratio learning amount, and vehicle state information such as brake, battery voltage, air conditioner coolant pressure, and steering using vehicle accessories.

In operation 805, the first electronic device can provide the driving information or the user body information based on the vehicle state information and the context information. In certain embodiments of the present disclosure, the first electronic device can provide the driving information or the user body information on a display 160.

Figure 9:
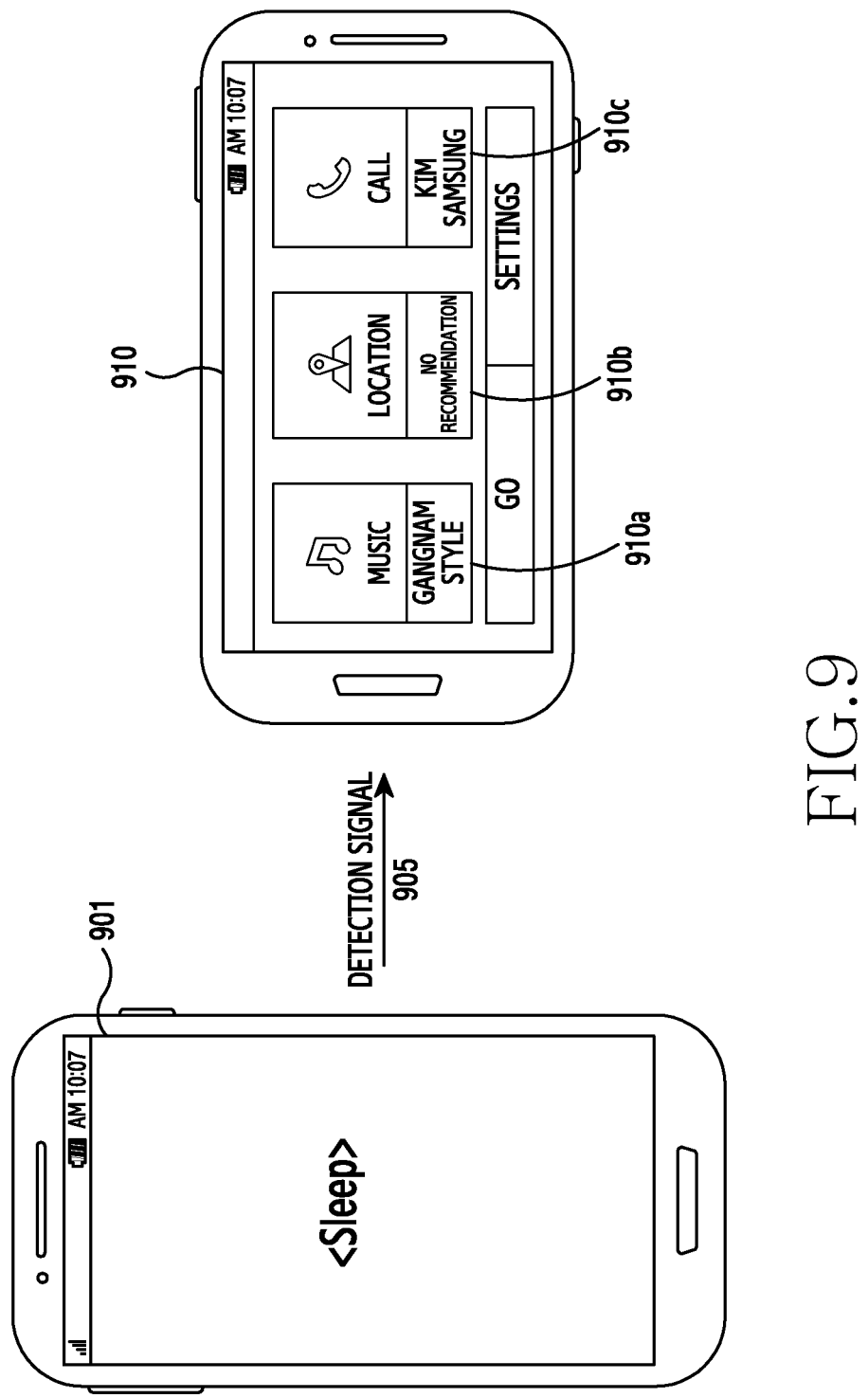
FIG. 9 illustrates a vehicle application execution screen of a first electronic device according to an embodiment of the present disclosure.

FIG. 9 depicts a vehicle application execution screen of a first electronic device according to an embodiment of the present disclosure.

The first electronic device can operate in a sleep mode. Notably, the first electronic device may not output a screen in the sleep mode 901. Note that "<Sleep>" does not actually appear on the screen but is only used as a label or reference.

Sensors (e.g., an acceleration sensor, a magnetic sensor, an inertial sensor, a microphone) of the first electronic device can operate even in the sleep mode. When the first electronic device is in the sleep mode, the sensors can detect the user boarding or the second electronic device for the vehicle near the first electronic device. In certain embodiments, the sensor may issue a detect signal 905. In response to the user boarding or the second electronic device 104 arriving near to the first electronic device 101, the first electronic device can automatically launch a vehicle application supporting a vehicle related service (e.g., music play 910*a*, navigation 910*b*, call 910*c*) and display its execution screen on a display part 910.

Upon detecting the second electronic device in vicinity, the first electronic device can provide the vehicle related service information to the second electronic device, receive a control command from the second electronic device, automatically launch the vehicle application, and display the execution screen on the display part 910.

FIG. 10 depicts a vehicle application execution screen of a first electronic device according to an embodiment of the present disclosure.

The first electronic device can detect the user's vehicle boarding according to the communication connection state with the second electronic device, for example, the OBD or the car kit of the vehicle, rather than detecting the user vehicle boarding according to a user's particular action or a surrounding environment change as shown in FIG. 9.

That is, in the sleep mode, the first electronic device can scan a second electronic device 1010 using a low-power wireless communication method, for example, using the BLE. Notably, the communication method used by the first electronic device to scan the second electronic device in vicinity can vary. In certain embodiments of the present disclosure, the first electronic device can display a scanning message 1015.

When the OBD 1020 in vicinity is connected according to the second electronic device scan result, the first electronic device can determine the user boarding. In certain embodiments of the present disclosure, the first electronic device can display a message indicating connection with the OBD 1025. Hence, the first electronic device can automatically launch the vehicle application supporting the vehicle related service (e.g., music play 1030*a*, navigation 1030*b*, call 1030*c*) and display an execution screen on its display part 1030.

FIG. 11 depicts a vehicle application setting screen of a first electronic device according to an embodiment of the present disclosure. A vehicle application setting screen can display a bar 1110 for setting a registered vehicle name (e.g., Device name). The vehicle application setting screen can display an auto launch bar 1120 when the registered vehicle is connected using Bluetooth, and an auto exit bar 1130 when the linked vehicle is disconnected using Bluetooth.

The user can set the auto launch function of the vehicle application by manipulating at least one of the bars 1110, 1120, and 1130 on the touch screen of the first electronic device. In so doing, the vehicle application setting value set by the user can be provided to the second electronic device in response to the vehicle application ID received from the second electronic device together with the beacon.

FIG. 12 depicts a vehicle application exit screen of a first electronic device according to an embodiment of the present disclosure.

The first electronic device can detect user disembarking according to the communication disconnection from the second electronic device, for example, the OBD or the car kit of the vehicle.

That is, when the communication is disconnected from the second electronic device, for example, the OBD during the vehicle application execution, the first electronic device can display a message 1210 notifying the communication disconnection from the OBD on a screen.

The first electronic device can collect and store location information of the corresponding point, for example, GPS coordinate information or altitude information using its GPS module, and output the location information.

The first electronic device can check the vehicle state at the communication disconnection using the multiple sensors, and output vehicle state information. For example, the first electronic device can output the vehicle driving time information, the vehicle driving distance information, and the rotation information, via message 1220 (note that "Vehicle State Output!" is merely used as a label.

After storing and outputting the location information or the vehicle state information, the first electronic device can automatically exit the vehicle application. In so doing, the first electronic device can display a message 1230 notifying the vehicle application exit on a screen.

FIG. 13 depicts a vehicle application exit screen of a first electronic device according to an embodiment of the present disclosure.
The first electronic device can display a vehicle application execution screen 1310 during the vehicle application execution. When the sensors (e.g., an acceleration sensor, a magnetic sensor, an inertial sensor, a microphone) of the first electronic device or the second electronic device (e.g., a wearable device, an OBD, a car kit) near the first electronic device detects the user of the first electronic device disembarking from the vehicle during the vehicle application execution, the first electronic device can collect and store location information of the corresponding point, for example, GPS coordinate information or altitude information using its GPS module and output the location information.

The first electronic device can check the vehicle state at the user disembarking using the sensors, and output vehicle state information via message 1320 (note that "Vehicle State Output!" is merely used as a label).

After storing and outputting the location information or the vehicle state information, the first electronic device can automatically exit the vehicle application. In so doing, the first electronic device can display a message 1330 notifying the vehicle application exit on a screen.

Figure 14:
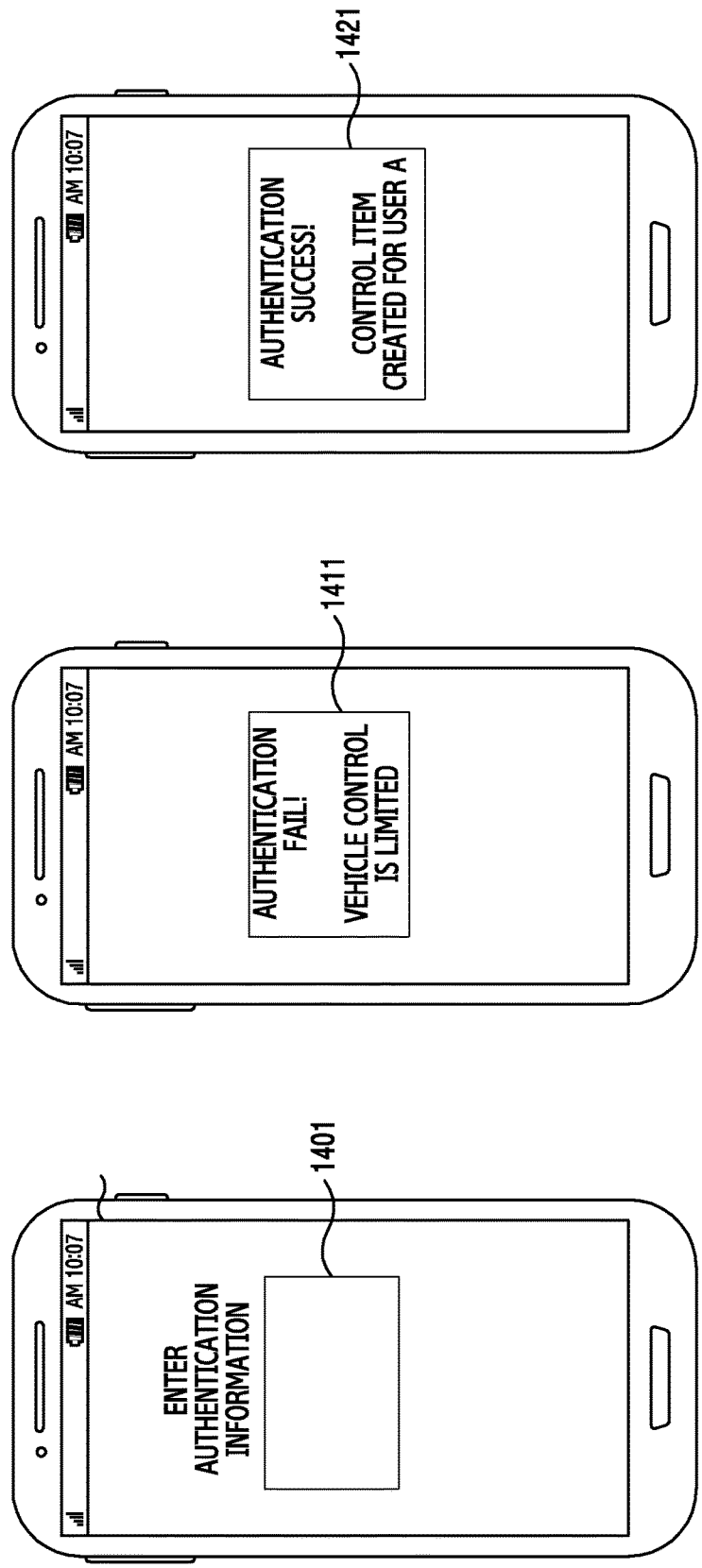
FIG. 14 illustrates authentication of a second electronic device according to an embodiment of the present disclosure.

FIG. 14 depicts authentication of a second electronic device according to an embodiment of the present disclosure. The second electronic device can process to execute the vehicle application of the first electronic device by communicating with the first electronic device.

The second electronic device can broadcast the beacon including the vehicle application identifier, and receive the vehicle identifier and the vehicle application setting value from the first electronic device receiving the beacon.

The second electronic device can authenticate the user of the first electronic device based on the vehicle identity and the vehicle application setting value received from the first electronic device. Authentication information can be input through the linked first electronic device or directly from the second electronic device. For example, the second electronic device can authenticate the vehicle or the user by prompting the user to input authentication information into an authentication information input screen 1401 on the screen of the first electronic device or the second electronic device and authentication information stored in the second electronic device. For example, the second electronic device can identify the vehicle of the user of the first electronic device or the user for boarding the vehicle through the authentication. The second electronic device can output authentication result screens, message 1411 indicating authentication failure and message 1421 indicating authentication success.

Figure 15:
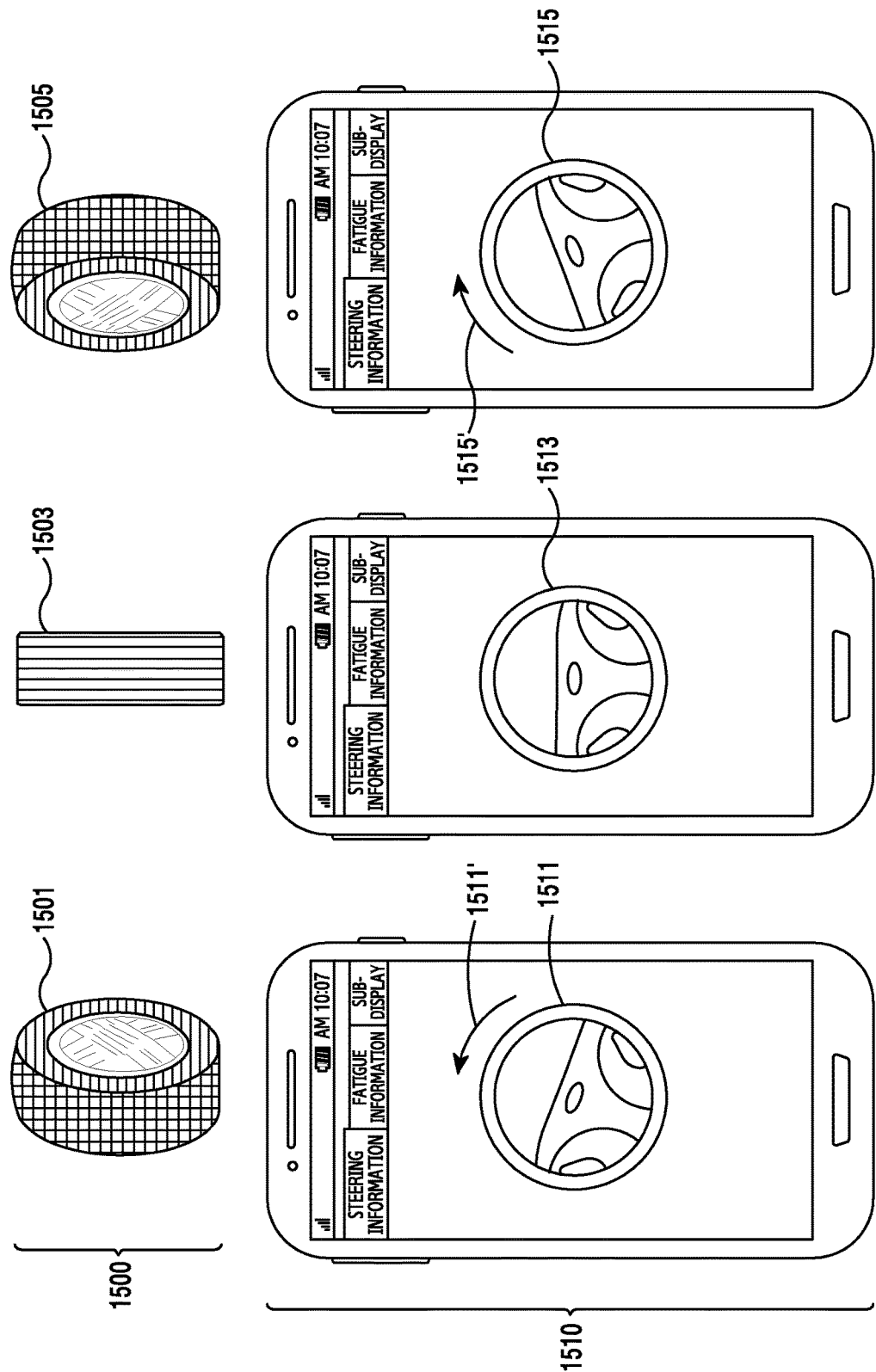
FIG. 15 illustrates a vehicle application execution screen of a first electronic device according to an embodiment of the present disclosure.

FIG. 15 depicts a vehicle application execution screen of a first electronic device according to an embodiment of the present disclosure.

The first electronic device can execute a vehicle application based on a remote control command of the linked second electronic device.

The first electronic device can display vehicle state information on a display part. For example, the vehicle state information can include a vehicle rotation state. The first electronic device can check the vehicle rotation state (e.g., wheel rotation) based on the movement of the first electronic device, the movement of the vehicle, and the user body motion.

The first electronic device can process to output the rotation state information obtained based on the movement, on a screen. The first electronic device can output the wheel rotation state using a virtual steering wheel. For example, the first electronic device can change and output the steering wheel state according to the wheel rotation state. The first electronic device can output information for guiding to turn the current wheels straight ahead. For example, the first electronic device may additionally output the steering wheel direction to rotate so as to move the current wheels to the front. Notably, the first electronic device can output the steering information in various manners instead of the virtual steering wheels.

In FIG. 15, the first electronic device displays information 1510 about the current vehicle wheels 1500 turned to the right 1501, straight 1503, and turned to the left 1505.

When the wheels 1500 are turned to the right 1501, the first electronic device can output the virtual steering wheel 1511 corresponding to the wheel turned to the right, and a steering wheel rotation direction (left turn) 1511' to move the wheel to straight 1503. When the wheels 1500 are straight 1503, the first electronic device can output a virtual steering wheel 1513 corresponding to the wheel pointing straight ahead. In this case, a steering wheel control direction may not be output. When the wheels 1500 are turned to the left 1505, the first electronic device can output a virtual steering wheel 1515 corresponding to the wheel pointing to the left, and a steering wheel control direction (right turn) 1515' for steering the wheel straight ahead.

FIG. 16 depicts a vehicle application execution screen of a first electronic device according to an embodiment of the present disclosure.

The first electronic device can execute a vehicle application based on a remote control command of the linked second electronic device, and thus output user body information (e.g., calorie consumption, fatigue information).

Based on the sensor values detected by various sensors, the first electronic device can acquire the user body information (e.g., body motion, pulse, blood pressure, body temperature, breathing of the user).

The first electronic device can determine steering rotation information and vehicle braking information based on the body motion, and thus determine the user body information. For example, the first electronic device can determine high fatigue by detecting a motion of suddenly rotating the steering or a motion of suddenly braking the vehicle. For example, the first electronic device may measure the calorie consumption corresponding to the motion based on the motion of rotating the steering.

In FIG. 16, the first electronic device outputs user fatigue information.

The first electronic device can provide reference fatigue and current user fatigue information 1601 corresponding to the vehicle driving time or distance. For example, a horizontal axis 1603 can indicate the time of driving, while the vertical axis can indicate the level of fatigue 1605. Curve 1607 indicates the level of fatigue with respect to time. Additionally, the display can indicate the baseline "Normal" 1610, an excellent range 1612 (indicating driver alertness), and a poor range 1614 (indicating driver fatigue).

Based on the measured fatigue, the first electronic device can provide additional information for reducing the fatigue. The additional function can include a route recommendation. For example, the first electronic device can search for a nearby service area using the navigation function and provide a route to the close service area.

Figure 17:
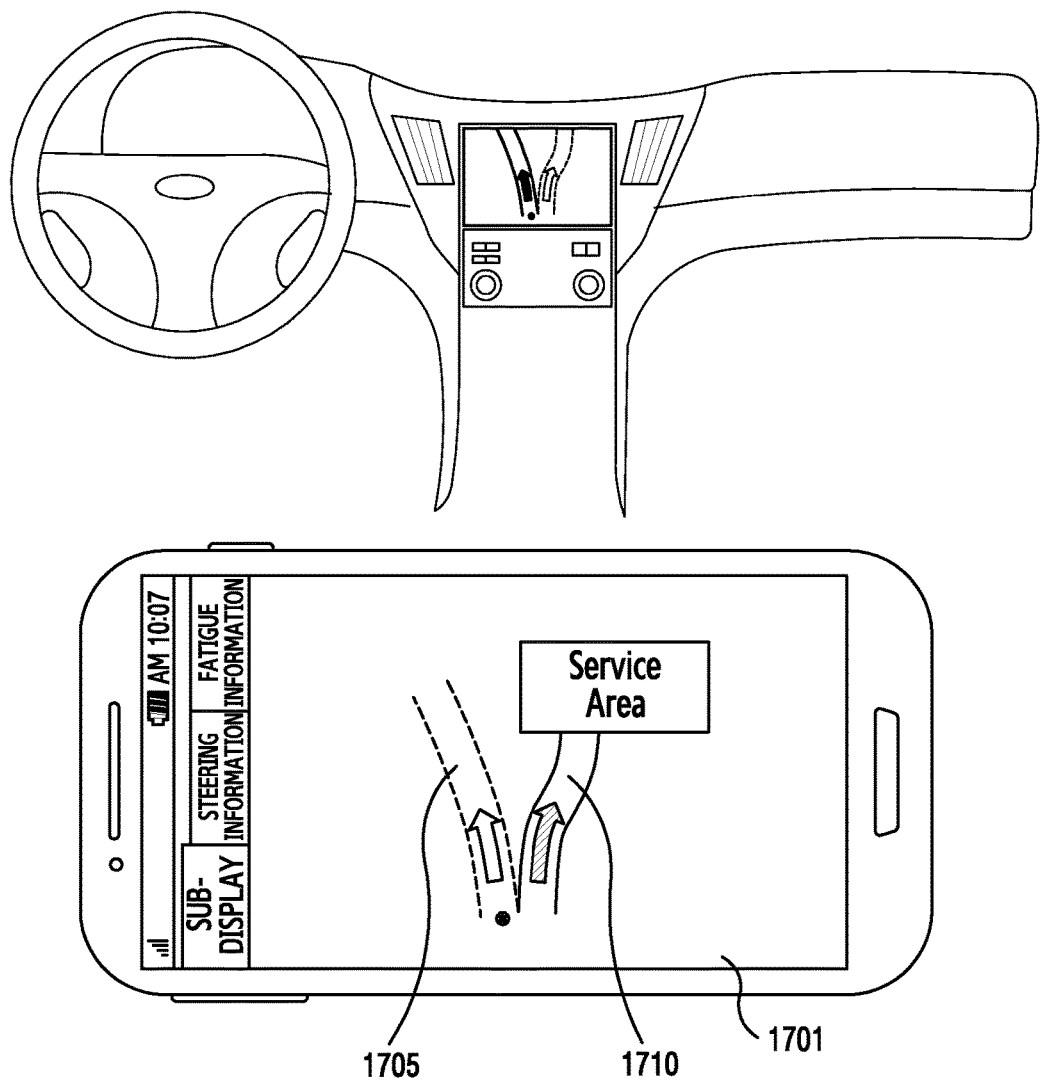
FIG. 17 illustrates operations of a first electronic device according to an embodiment of the present disclosure.

FIG. 17 depicts operations of a first electronic device according to an embodiment of the present disclosure.

The first electronic device can provide driving information by serving as the sub-display of the linked second electronic device. The first electronic device can serve as the sub-display and process to output information relating to at least part of the operations of the second electronic device on its display part. The first electronic device can output some information of the second electronic device providing the navigation function. For example, when the second electronic device provides information indicating the driving direction change during the navigation function execution, the first electronic device can separately output direction change information alone. For example, when the second electronic device outputs a music play screen, the first electronic device can separately output a menu item for controlling the music play. When the first electronic device serves as an input device and detects an input of the output menu item, it can provide a signal corresponding to the input to the second electronic device.

In FIG. 17, the first electronic device acts as the sub-display and provides additional information for reducing the fatigue based on the measured fatigue. The additional function can include a route recommendation, and the first electronic device can search for a nearby service area using the navigation function and provide a route 1701 to the close service area. In so doing, the second electronic device linked to the first electronic device can maintain existing route information output. In an exemplary embodiment, when curve 1607 value for the amount of time driving 1603 enters the poor range 1614, the first electronic device can reroute the vehicle from the regular route 1705 to a route 1710 leading to a service or rest area.

Figure 18:
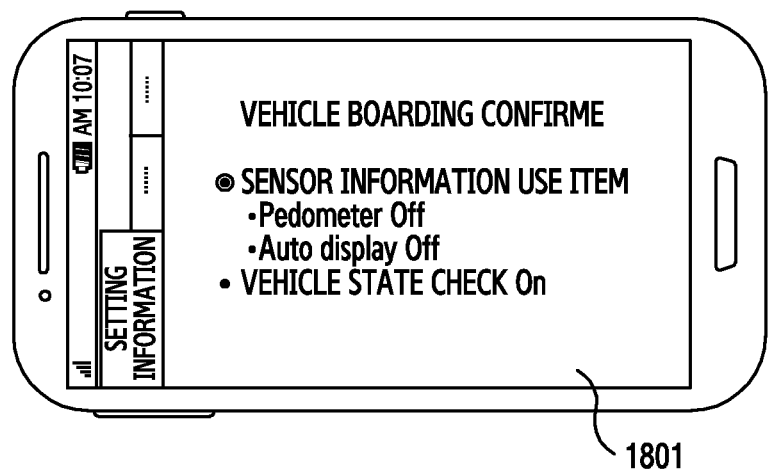
FIG. 18 illustrates operations of a first electronic device according to an embodiment of the present disclosure.

FIG. 18 depicts operations of a first electronic device according to an embodiment of the present disclosure.

The first electronic device can provide the vehicle movement, the body motion, and the driving information based on the vehicle movement. When being linked to the second electronic device, the first electronic device can change an algorithm for processing the movement information. The first electronic device can obtain a sensor value through the sensor part. The first electronic device can use the sensor value in different manners according to the communication connection or disconnection with the second electronic device.

The first electronic device, when not linked to the second electronic device, can use the sensor value to determine the driving distance (e.g., a pedometer function) or the proximity (e.g., auto screen).

The first electronic device, when linked to the second electronic device, can use the sensor value to check the vehicle state (e.g., the vehicle steering, the body motion for checking the sudden brake).

In FIG. 18, the first electronic device outputs item information 1801 for using the sensor information according to the communication connected to the second electronic device.

Figure 19:
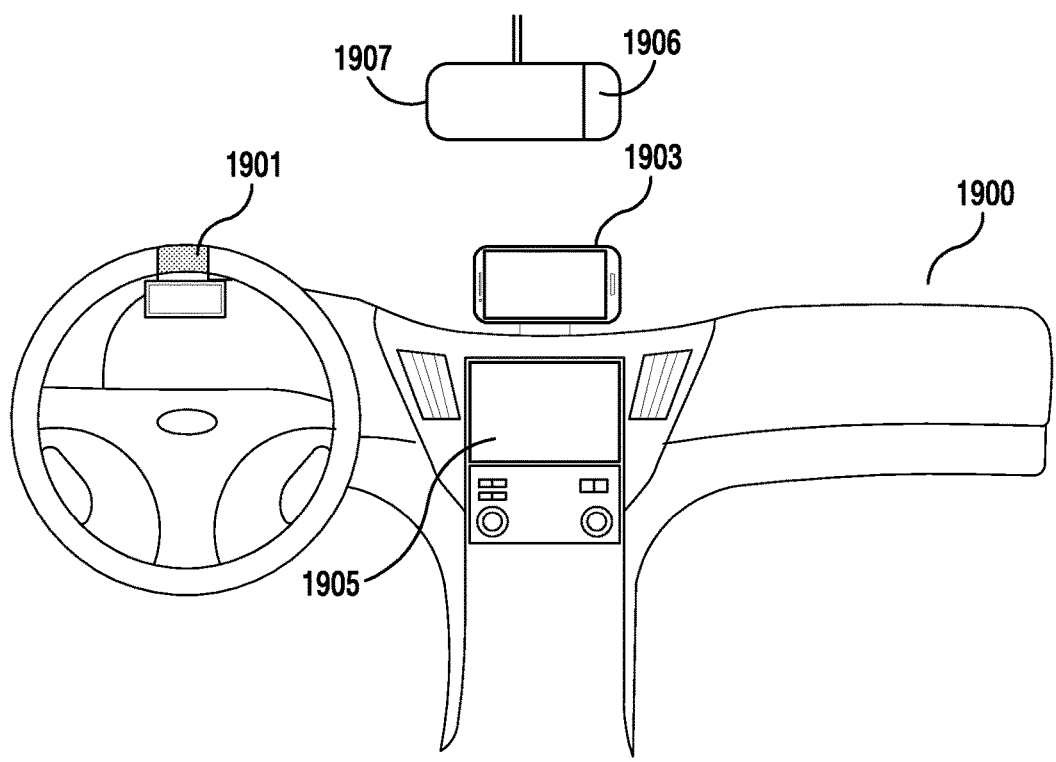
FIG. 19 illustrates a first electronic device according to an embodiment of the present disclosure.

FIG. 19 depicts a first electronic device according to an embodiment of the present disclosure.

The first electronic device 1903 can establish communication to the second electronic device. The second electronic device 1905 can be disposed in the vehicle. The second electronic device can include a car kit (e.g., a vehicle head unit) 1905. For example, the second electronic device can include an electronic device attachable into the vehicle 1900. For example, the second electronic device can include an electronic device 1901 attachable to a steering wheel, an electronic device 1903 mounted inside the vehicle, and an electronic device 1906 mounted to a rear-view mirror 1907. The second electronic device can be electrically connected to an accessory such as car kit or OBD.

Figure 20:
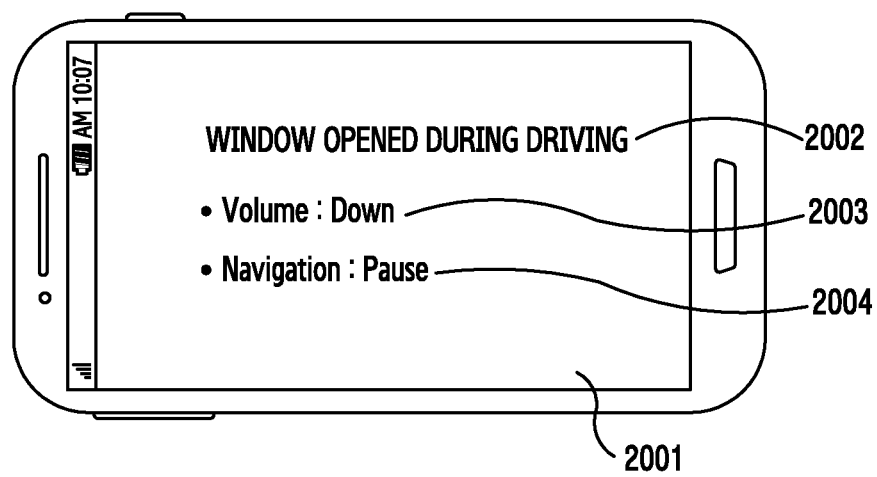
FIG. 20 illustrates operations of a first electronic device according to an embodiment of the present disclosure.

FIG. 20 depicts operations of a first electronic device according to an embodiment of the present disclosure.

The first electronic device can control at least one operation based on the vehicle state.

The first electronic device can check the vehicle state through the sensor or the linked second electronic device. The second electronic device can define an operation corresponding to the vehicle state and then process the operation corresponding to the checked state.

In FIG. 20, the first electronic device 2001 checks the vehicle state where the window is opened during the driving (indicator 2002), reduces a preset volume to a predefined volume (indicator 2003), and pauses the current navigation function (indicator 2004). The first electronic device can reduce its battery consumption through the operation corresponding to the vehicle driving state, and prevent the phone call conversation from being exposed to other person by switching a call mode according to the window opening.

A method for controlling a first electronic device can include receiving a beacon from a second electronic device, providing device identification information to the second electronic device based on the beacon, and conducting at least one function corresponding to a signal received from the second electronic device.

The providing of the device identification information to the second electronic device based on the beacon can include sending the device identification information comprising at least one of a device identifier, a vehicle identifier, and a vehicle application setting value, to the second electronic device in response to vehicle service identification information of the beacon.

The conducting of the at least one function corresponding to the signal received from the second electronic device can include, when measuring user body information based on at least one of a vehicle movement, a movement of the first electronic device, and a body motion according to the signal received from the second electronic device, outputting the measured body information.

The conducting of the at least one function corresponding to the signal received from the second electronic device can include, when a disembarking pattern is detected, receiving steering rotation information from the second electronic device, and outputting the received steering rotation information.

The conducting of the at least one function corresponding to the signal received from the second electronic device can include, when detecting a vehicle estate based on a signal received from the second electronic device, controlling the first electronic device according to the vehicle state.

The conducting of the at least one function corresponding to the signal received from the second electronic device can include, when detecting communication connection to the second electronic device based on a signal received from the second electronic device, using a sensor value collected by a sensor part in a first manner, and when detecting communication disconnection from the second electronic device, using a sensor value collected by the sensor part in a second manner.

The conducting of the at least one function corresponding to the signal received from the second electronic device can include, when detecting communication connection to the second electronic device based on a signal received from the second electronic device, outputting information relating to at least part of operations of the second electronic device, through the first electronic device.

A method for controlling a second electronic device can include providing a beacon comprising service identification information according to a search of a first electronic device, and providing the first electronic device with a signal indicating at least one function corresponding to device identification information received from the first electronic device.

The providing of the first electronic device with the signal indicating the at least one function corresponding to the device identification information received from the first electronic device can include requesting authentication information from the first electronic device, determining a user corresponding to the authentication information received from the first electronic device, and providing the first electronic device with a signal indicating at least one function corresponding to the user.

The second electronic device can include outputting information of at least one function executed in the second electronic device, through the first electronic device.

As set forth above, the control method and the electronic device thereof provide the device identification information to the second electronic device based on the beacon including the vehicle service identification information received from the second electronic device (the electronic device inside the vehicle), and conduct at least one function corresponding to the signal received from the second electronic device. Therefore, the user does not need to separately command or manipulate the vehicle application execution.

Further, the electronic device can easily control the vehicle related function by controlling the vehicle or the electronic device based on, for example, the vehicle state information.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, or a combination hardware configured with machine executable code and may be performed in whole or in part within the programmed instructions of a computer. No claim element herein is to be construed under the provisions of 35 U.S.C. 112, sixth paragraph, unless the element is expressly recited using the phrase "means for".

In addition, an artisan understands and appreciates that a "processor" or "microprocessor" constitute hardware in the claimed invention. Under the broadest reasonable interpretation, the appended claims constitute statutory subject matter in compliance with 35 U.S.C. §101.

The functions and process steps herein may be performed automatically or wholly or partially in response to user command. An activity (including a step) performed automatically is performed in response to executable instruction or device operation without user direct initiation of the activity.

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. §101 and does not constitute software per se.

While the disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. A first electronic device comprising:
a communication unit; and
a control unit configured to control the communication unit to receive a first signal comprising application identification information from a second electronic device, control the communication unit to transmit device identification information to the second electronic device based on the application identification information in response to receiving the first signal, control the communication unit to receive a second signal from the second electronic device, and execute at least one function related to an application corresponding to the application identification information based on the received second signal.

2. The first electronic device of claim 1, wherein the first signal comprises a beacon signal comprising the application identification information.

3. The first electronic device of claim 1, wherein the device identification information comprises at least one of a device identifier, a vehicle identifier, and a vehicle application setting value.

4. The first electronic device of claim 1, wherein the control unit controls the communication unit to transmit the device identification information to the second electronic device using a first communication method, and controls the communication unit to receives the second signal from the second electronic device using a second communication method.

5. The first electronic device of claim 1, further comprising:
a display; and
at least one sensor,
wherein the control unit controls the at least one sensor to measure user body information based on at least one of a vehicle movement, a movement of the first electronic device, and a body motion based on the second signal and controls the display to output measured body information.

6. The first electronic device of claim 1, further comprising:
a display,
wherein, when a disembarking pattern is detected, the control unit controls the communication unit to receives steering rotation information from the second electronic device and controls the display to outputs the received steering rotation information.

7. The first electronic device of claim 1, wherein, when detecting a vehicle state, the control unit controls the first electronic device according to the vehicle state.

8. The first electronic device of claim 1, further comprising:
at least one sensor,
wherein, when detecting communication connection to the second electronic device, the control unit uses a sensor value collected by the at least one sensor in a first manner, and when detecting communication disconnection from the second electronic device, the control unit uses a sensor value collected by the at least one sensor in a second manner.

9. The first electronic device of claim 1, wherein, when detecting communication connection to the second electronic device, the control unit controls the communication unit to transmit information relating to at least portion of operations of the second electronic device, to the first electronic device.

10. An electronic device comprising:
a communication unit; and
a control unit configured to control the communication unit to transmit a first signal comprising application identification information, control the communication unit to receive device identification information from another electronic device in response to transmitting the first signal, and control the communication unit to transmit a second signal for executing at least one function related to an application corresponding to the application identification information to the another electronic device.

11. The electronic device of claim 10, wherein the control unit controls the communication unit to receives authentication information from the another electronic device, and provides, based on the authentication information received from the another electronic device, the another electronic device with the signal.

12. The electronic device of claim 10, wherein the control unit outputs information of at least one function executed in the electronic device, through the another electronic device.

13. A method for controlling a first electronic device, comprising:
receiving a first signal comprising application identification information from a second electronic device;
transmitting device identification information to the second electronic device based on the application identification information in response to receiving the first signal;
receiving a second signal from the second electronic device; and
executing at least one function related to an application corresponding to the application identification information based on the second signal.

14. The method of claim 13, wherein the transmitting of the device identification information comprises:
transmitting the device identification information comprising at least one of a device identifier, a vehicle identifier, and a vehicle application setting value, to the second electronic device.

15. The method of claim 13, wherein the executing of the at least one function related to an application comprises:
measuring user body information based on at least one of a vehicle movement, a movement of the first electronic device, and a body motion based on the second signal; and
outputting the measured body information.

16. The method of claim 13, wherein the executing of the at least one function related to an application comprises:
detecting a disembarking pattern;
receiving steering rotation information from the second electronic device; and
outputting the received steering rotation information.

17. The method of claim 13, wherein the executing of the at least one function related to an application comprises:
detecting a vehicle state; and
controlling the first electronic device according to the vehicle state.

18. The method of claim 13, wherein the executing of the at least one function related to an application comprises:
when detecting communication connection to the second electronic device, using a sensor value collected by a sensor in a first manner, and when detecting communication disconnection from the second electronic device, using a sensor value collected by the sensor in a second manner.

19. The method of claim 13, wherein the executing of the at least one function related to an application comprises:
when detecting communication connection to the second electronic device, transmitting information relating to at least portion of operations of the second electronic device, to the first electronic device.

20. A non-transitory computer-readable recording medium storing a plurality of executable instructions wherein execution of the executable instructions by a processor causes receiving a first signal comprising application identification information from a second electronic device, transmitting device identification information to the second electronic device based on the application identification information in response to receiving the first signal, receiving a second signal from the second electronic device, and executing at least one function related to an application corresponding to the application identification information based on the received second signal.

* * * * *